United States Patent
Nakamura et al.

[11] Patent Number: 6,050,689
[45] Date of Patent: Apr. 18, 2000

[54] PROJECTION TYPE DISPLAY APPARATUS

[75] Inventors: Hiroki Nakamura, Ageo; Yoshihiro Watanabe, Gyouda; Hidenori Aizawa, Natori; Atsushi Sekine, Kasukabe, all of Japan

[73] Assignees: Kabushiki Kaisha Toshiba, Kanagawa-ken; Nikon Corporation, Tokyo; Sendai Nikon Corporation, Miyagi-ken, all of Japan

[21] Appl. No.: 09/116,934

[22] Filed: Jul. 17, 1998

[30] Foreign Application Priority Data

Jul. 18, 1997 [JP] Japan ................................. 9-209624

[51] Int. Cl.⁷ .................................................. G03B 21/14
[52] U.S. Cl. ................................. 353/31; 353/34; 349/8
[58] Field of Search ............................ 353/31, 30, 34, 353/37, 38, 97; 349/5, 7, 8

[56] References Cited

U.S. PATENT DOCUMENTS

| | | | |
|---|---|---|---|
| 5,272,496 | 12/1993 | Nicolas et al. | 353/20 |
| 5,455,694 | 10/1995 | Ariki et al. | 359/40 |
| 5,548,349 | 8/1996 | Mizuguchi et al. | 349/5 |
| 5,623,349 | 4/1997 | Clarke | 349/8 |
| 5,684,548 | 11/1997 | Ariki et al. | 349/57 |
| 5,726,719 | 3/1998 | Tanaka et al. | 349/8 |
| 5,748,376 | 5/1998 | Lin et al. | 349/5 |
| 5,777,804 | 7/1998 | Nakamura et al. | 359/727 |
| 5,829,858 | 11/1998 | Levis et al. | 353/98 |
| 5,852,479 | 12/1998 | Ueda et al. | 349/5 |

FOREIGN PATENT DOCUMENTS

| | | |
|---|---|---|
| 3-111806 | 5/1991 | Japan . |
| 4-60538 | 2/1992 | Japan . |
| 5-249452 | 9/1993 | Japan . |
| 8-227103 | 9/1996 | Japan . |

*Primary Examiner*—William Dowling
*Attorney, Agent, or Firm*—Vorys, Sater, Seymour and Pease LLP

[57] ABSTRACT

Disclosed is a single plate projection type display apparatus which is capable of achieving a high luminance without an increase in an output of a light source. A first lens plate having a plurality of lenses divides a light from a light source into a plurality of light beams. A second lens plate having a plurality of lenses superposes the divided plurality of light beams on a light valve, thereby performing an illumination. A color separation optical system composed of dichroic mirrors which are perpendicular to an XY plane and form predetermined angles to each other, performs a color separation for the light beams from the second lens plate. The light valve modulates R, G and B light beams which are incident thereonto. The modulated lights are projected by a projection lens. The whole shape of the second lens plate is a rectangle. The second lens plate is disposed so that a longitudinal direction of the longer side of the whole shape of the rectangle is perpendicular to a plane formed by a normal line to the dichroic mirrors and an optical axis immediately before an incidence onto the dichroic mirrors.

17 Claims, 12 Drawing Sheets

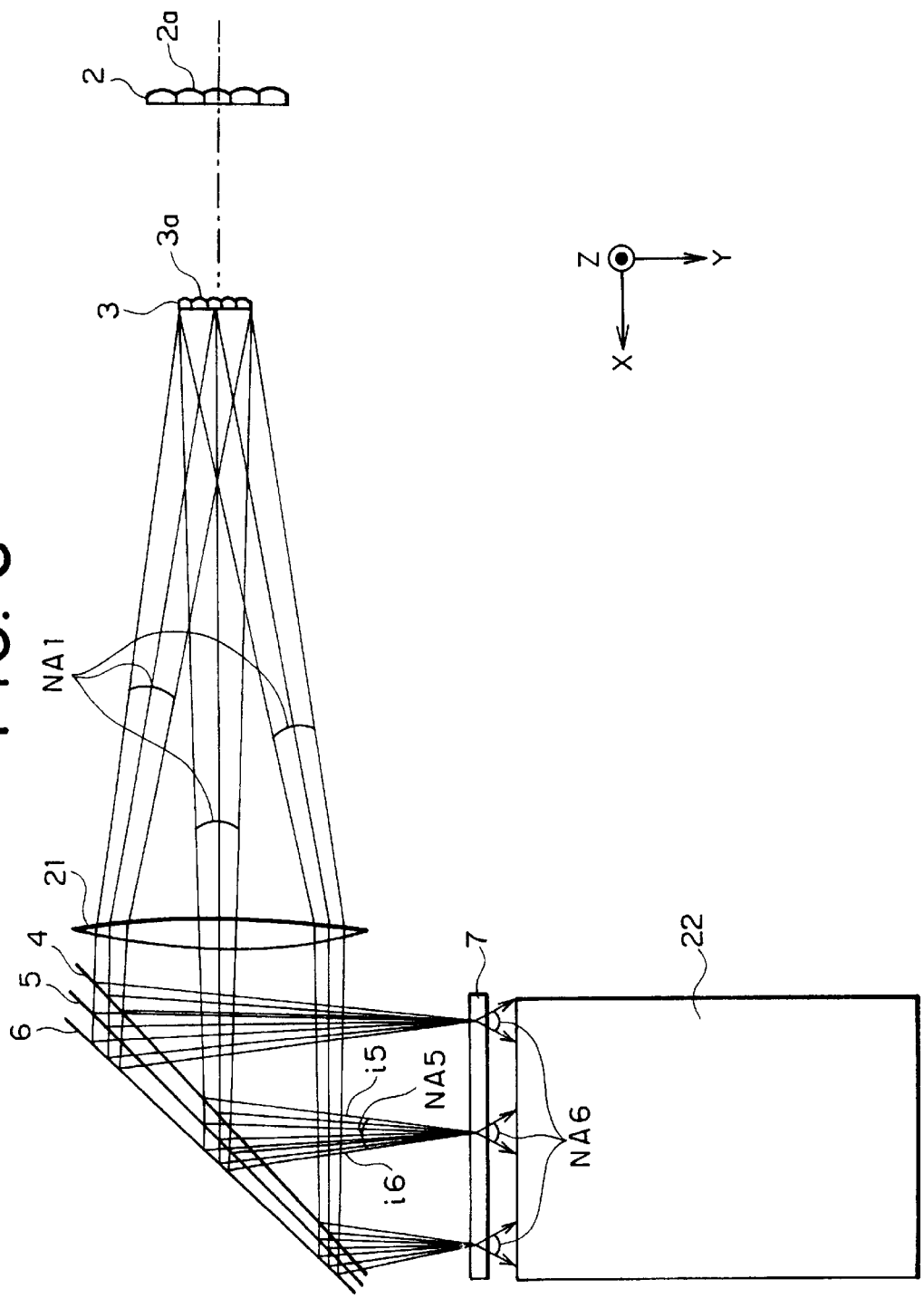

PROJECTION TYPE DISPLAY APPARATUS

This application claims the benefit of the Japanese Application No. 9-209624 which is hereby incorporated by reference.

BACKGROUND OF THE INVENTION

1. Field of the Invention

The present invention relates to a single plate color projection type display apparatus which uses a single liquid crystal light valve, more particularly to a projection apparatus which irradiates respective R, G and B light beams from different directions onto its single liquid crystal light valve and projects modulated light beams of the respective R, G and B light beams emitted from the light valve to perform full color display.

2. Descriptions of the Related Arts

A projection type display apparatus proposed in Japanese Patent Laid Open No. 4-60538 has been known, which allows R, G and B light beams to be incident onto a single liquid crystal light valve from different directions and composes modulated light beams of the respective R. G and B light beams emitted from the light valve to project the composed light.

This conventional projection type display apparatus will be described with reference to FIGS. 11 and 12. FIG. 11 is a schematic diagram showing a constitution of the conventional projection type display apparatus. FIG. 12 is a schematic section view showing a light valve of the display apparatus shown in FIG. 11.

In this conventional projection type display apparatus, a source light emitted from a light source, which is constituted by the lamp 101 and the spherical mirror 102 disposed on the rear surface of the lamp 101, is shaped into approximately a parallel light beam by the shaping lens 103. This parallel light beam is incident onto a color separation optical system composed of the R light reflection dichroic mirror 104R, the G light reflection dichroic mirror 14G and the B light reflection dichroic mirror 104B which are disposed on the optical axis so that incidence angle of the light beam relative to the dichroic mirror 104R is about 45 degrees. The dichroic mirrors 104R, 104G and 104B are disposed so that they are perpendicular to the paper plane and form predetermined angles of several degrees with each other. The arrangement causes the R light reflected by the R light reflection dichroic mirror 104R, the G light reflected by the G light reflection dichroic mirror 104G and the B light reflected by the B light reflection dichroic mirror 104B to be incident onto the light valve composed of the liquid crystal display panel 120 and the micro lens array 110 additionally provided in the panel 120, while forming different angles relative to them.

As shown in FIG. 12, the liquid crystal display panel 120 has a structure in which the liquid crystal 123 is sealed between the two transparent glass substrates 124 and 125. The liquid crystal 123 is sandwiched, for example, between the counter electrode 122 formed of an ITO film and pixel electrodes 121R, 121G, and 121B formed of an ITO film arranged like a matrix, and controlled in response to the electric field between these electrodes. Each of the pixel electrodes 121R, 121G, and 121B is, although not shown in FIG. 12, electrically connected to the scan line and the signal line though the thin film transistor. It should be noted that in FIG. 12, a polarization plate and an orientation film are omitted, which are components of the liquid crystal display panel 120.

As described above, the R, G and B light beams incident onto the micro lenses of the micro lens array 110 are caused to be incident collectively onto color pixels, while forming the predetermined different angles as shown in FIGS. 11 and 12. Each of the R, G and B light beams incident onto the color pixel is modulated in the corresponding pixel by the pixel signal, so that each light exits outward. Each light passes through the field lens 105 and is projected onto the screen 107 by the projection lens 106, so that an image in full color is displayed. It should be noted that in the liquid crystal panel 120, a non-linear switching element such as TFT and MIM is disposed for each pixel of the liquid crystal light valve and the switching element is selectively switched, thereby modulating each color light beam by the foregoing signal.

In recent years, for the projection type display apparatus, enlargement of the screen for its projection image has progressed. However, with the enlargement of the screen, brightness of the projection image projected by the foregoing conventional projection type display apparatus is not satisfactory and luminance with a higher brightness has been demanded.

In order to achieve a higher luminance for the conventional projection type display apparatus, a lamp exhibiting a high power, which is used for the light source, may be employed. In this case, other problems such as an establishment of a cooling method to cope with the heat generation of the light source newly arise, which must be solved.

SUMMARY OF THE INVENTION

From viewpoint of such circumstances, an object of the present invention is to provide a so-called single plate projection type display apparatus capable of achieving a high luminance without increasing an output of a light source.

As a result of research, paying attention to characteristics of the foregoing conventional projection type display apparatus due to the structure of a peculiar color separation optical system in which three dichroic mirrors 104R, 104G and 104B are arranged so as to be perpendicular to a predetermined plane (the paper plane in FIG. 11) and so as to form predetermined angles with respect to each other, the inventors of the present invention found a structure which, among lights emitted from the light source, can effectively utilize a light which has not heretofore been effectively utilized for formation of the projection image. The present invention was made based on such information.

According to a first aspect of the present invention, the projection type display apparatus comprises: a light source for generating an illumination light; a color separation optical system which has a plurality of mirror planes, which are perpendicular to a predetermined plane including an optical axis and form predetermined angles with each other, said color separation optical system separating the light from said light source into a plurality of light beams of different colors by said plurality of mirror planes and emitting the color light beams in different predetermined directions; a light valve which modulates the light beams of the different colors respectively when said light beams of different colors emitted from said color separation optical system are collectively incident thereon from directions corresponding to said predetermined directions; a numerical aperture defining device for defining, with respect to each of said light beams of different colors collected on said light valve, a first numerical aperture to be smaller than a second numerical aperture, where the first numerical aperture is so defined to be in a direction on a plane in parallel with said predetermined plane and perpendicular to an optical axis for each of said light beams, and the second numerical aperture is so defined to be in a direction perpendicular to said predetermined plane and perpendicular to an optical axis for each of said light beams; and a projection optical system which projects the light beams modulated by said light valve.

According to a second aspect of the present invention, the projection type display apparatus comprises: a light source for generating an illumination light; a color separation optical system which has a plurality of mirror planes, which are perpendicular to a predetermined plane including an optical axis and form predetermined angles with each other, said color separation optical system separating the light from said light source into a plurality of light beams of different colors by said plurality of mirror planes and emitting the color light beams in different predetermined directions; a light valve which modulates said light beams of the different colors respectively when said light beams of different colors emitted from said color separation optical system are collectively incident thereon from directions corresponding to said predetermined directions; a numerical aperture defining device for defining, a first numerical aperture to be smaller than a second numerical aperture, where the first numerical aperture is so defined to be with respect to all the light beams of different colors collected on said light valve and in a direction on a plane in parallel with said predetermined plane and perpendicular to an optical axis for each of said light beams, and the second numerical aperture is so defined to be with respect to each of said light beams of different colors collected on said light valve and in a direction perpendicular to said predetermined plane and perpendicular to an optical axis for each of said light beams; and a projection optical system which projects the light beams modulated by said light valve.

According to a third aspect of the present invention, the projection type display apparatus comprises: a light source for generating an illumination light; a color separation optical system which has a plurality of mirror planes, which are perpendicular to a predetermined plane including an optical axis and form predetermined angles with each other, said color separation optical system separating the light from said light source into a plurality of light beams of different colors by said plurality of mirror planes and emitting the color light beam different predetermined direction; a light valve which modulates said light beams of the different colors respectively when said light beams of different colors emitted from said color separation optical system are collectively incident thereon from directions corresponding to said predetermined directions; a numerical aperture defining device including a first lens plate having a plurality of lenses, which divides the light from said light source into a plurality of light beams, and a second lens plate having a plurality of lenses, which superposes the plurality of light beams divided by said first lens onto said light valve, thereby illuminating said light valve with the superposed light beams, a refractive power of said first lens plate being larger than that of said second lens plate relative to a direction in parallel with said predetermined plane as well as perpendicular to an optical axis; and a projection optical system which projects the light beams modulated by said light valve.

According to a fourth aspect of the present invention, the projection type display apparatus comprises: a light source for generating an illumination light; a color separation optical system which has a plurality of mirror planes, which are perpendicular to a predetermined plane including an optical axis and form predetermined angles with each other, said color separation optical system separating the light from said light source into a plurality of light beams of different colors by said plurality of mirror planes and emitting said color light beams in different predetermined directions; a light valve which modulates said light beams of the different colors respectively when said light beams of different colors emitted from said color separation optical system are collectively incident thereon from directions corresponding to said predetermined directions; a numerical aperture defining device including a first lens plate having a plurality of lenses, which divides the light from said light source into a plurality of light beams, and a second lens plate having a plurality of lenses, which superposes the plurality of light beams divided by said first lens onto said light valve, thereby illuminating said light valve with the superposed light beams, a refractive power of said first lens plate being smaller than that of said second lens plate relative to a direction perpendicular to said predetermined plane; and a projection optical system which projects the light beams modulated by said light valve.

According to a fifth aspect of the present invention, a projection type display apparatus comprises: a light source for generating an illumination light; a color separation optical system having a color separation surface which is disposed perpendicular to a predetermined plane including an optical axis and which separates the illumination light into a plurality of color beams; a light valve for modulating each of said color beams from said color separation optical system; a projection optical system for projecting light beams modulated by said light valve; and a numerical aperture defining means for defining, with respect to each of said light beams guided on said light valve, a first numerical aperture to be smaller than a second numerical aperture, where the first numerical aperture is defined in a direction on a plane in parallel with said predetermined plane and perpendicular to an optical axis for each of said light beams, and the second numerical aperture is defined in a direction perpendicular to said predetermined plane and perpendicular to said optical axis for each of said light beams.

The projection type display apparatus of the preferred aspect of the present invention comprises a color separation optical system which performs a color separation for a light from a light source to divide into first, second and third color light beams, thereby emitting the first, second and third color light beams in first, second and third directions which are different from each other; a light valve which receives the first, second and third color light beams emitted from the color separation optical system from three different directions corresponding to the first, second and third directions, thereby modulating the first, second and third color light beams; and a projection optical system which projects the lights modulated by the light valve, wherein the color separation optical system comprises first, second and third mirror planes sequentially arranged from a light incidence side so that the first, second and third mirror planes are perpendicular to a predetermined plane and form predetermined angles with each other; the first mirror plane has a dichroic property to reflect the first color light beam in the first direction and to allow the second and third color light beams to pass therethrough; the second mirror plane has a dichroic property to reflect the second color light beam in the second direction and to allow the third color light beam to pass therethrough; the third mirror plane has either a dichroic property or a total reflection property to reflect the third color light beam in the third direction; first numerical apertures of the first, second and third color light beams collected at respective positions on the light valve, which first numeral apertures each is on a plane including an optical axis and perpendicular to a plane optically corresponding to a reference plane formed by a normal line to the mirror planes and the optical axis of the color light beams immediately before an incidence onto the color separation optical system, is set to be larger than second numerical apertures of the first, second and third color light beams collected at respective portions on the light valve, which first numeral apertures each is on a plane including the optical axis and in parallel with the plane optically corresponding to the reference plane.

The color separation optical system may be constituted by three dichroic mirrors, similar to the foregoing conventional projection type display apparatus. Alternatively, the color separation optical system may be constituted so that among the three dichroic mirrors, one may be replaced by a total reflection mirror. Further, the color separation optical system may be a combination of prisms having surfaces on which a dichroic film is formed so as to possess an equivalent property to the dichroic mirror. This point applies to later-described preferred aspects.

The light valve may be provided with a plurality of unit pixels composed of a first color pixel for modulating the first color light, a second color pixel for modulating the second color light and a third color pixel for modulating the third color light, and a micro lens array having a plurality of micro lenses for selectively collecting the color lights at the corresponding color pixels. Each of the color pixels may be, for example, a rectangular shape having a long side in a predetermined direction.

It should be noted that in the description of the specification of this application, a numerical aperture of a light beam on a certain plane (including an optical axis) means an angle formed by the outermost rays of the light beam on that plane.

Since the foregoing conventional projection type display apparatus employs a relay lens having an aperture diaphragm with a circular opening based on the technological common sense as described above, this implies that the foregoing first numerical apertures are set to the same as the foregoing second numerical apertures. Contrary to this, in the above described preferred aspect, since the first numerical apertures are set to be larger than the second numerical apertures, it is possible to receive more light from the light source by a difference between the first and second numerical apertures, thereby effectively utilizing the received light to form a projection image. Consequently, according to the preferred aspect, a brighter projection image can be obtained compared to the conventional projection type display apparatus without an increase in the output of the light source, resulting in a high luminance of the display apparatus.

Although the first and second numerical apertures of the foregoing conventional projection type display apparatus are set to be equal, if these numerical apertures are set to be large, much light can be received from the light source in accordance with an increase in the numerical aperture, so that a bright projection image will be obtained. However, in this case, a divergent angle of the light beam of the whole modulated light emitted from the light valve is large in all directions including the optical axis. On the conventional projection optical system, a large clear aperture must be used. Realization of such as projection optical system of a large clear aperture is difficult and a bright projection image can not be obtained. Alternatively, even if such a projection optical system of a large clear aperture were obtained, it is extremely expensive. Contrary to this, in the above-described preferred aspect, a bright projection image can be obtained without increasing the clear aperture of the projection optical system, utilizing the peculiar structure of the foregoing color separation optical system utilizing, that is, the fact that the foregoing first, second and third mirror planes are perpendicular to a predetermined plane and they form predetermined angles with each other. Specifically, if originating in the peculiar structure of the foregoing color separation optical system, the first and second numerical apertures are set be equal, the first divergent angle of the whole modulated light in the direction corresponding to the foregoing angle, which is emitted from the light valve, is larger than the second divergent angle of the whole modulated light in a direction perpendicular to the direction corresponding to that angle. It should be noted that the first divergent angle depends on the first numerical apertures and angles formed by the mirror planes and the second divergent angle depends on the second numerical apertures. In the preferred aspect, since the first numerical apertures are set to be larger than the second numerical apertures, the whole numerical aperture of the second numerical apertures can be made large without enlarging the first numerical apertures. Thus, without enlarging a divergent angle in a direction corresponding to the foregoing angle of the whole modulated light which is by nature large, a small divergent angle in a direction perpendicular to a direction corresponding to the foregoing angle of of the whole modulated light can be made large, so that both of the divergent angles can be made equal to each other. Therefore, according to the above-described preferred aspect, a bright projection image can be obtained without increasing a clear aperture of the projection optical system.

The projection type display apparatus of the preferred aspect of the present invention comprises a color separation optical system which performs a color separation for a light from a light source to divide into first, second and third color light beams, thereby emitting the first, second and third color light beams in first, second and third directions which are different from each other; a light valve which receives the first, second and third color light beams emitted from the color separation optical system from three different directions corresponding to the first, second and third directions, thereby modulating the first, second and third color light beams; and a projection optical system which projects a modulated light modulated by the light valve, wherein the color separation optical system comprises first, second and third mirror planes sequentially arranged from a light incidence side so that the first, second and third mirror planes are perpendicular to a predetermined plane and form predetermined angles with each other; the first mirror plane has a dichroic property to reflect the first color light beam in the first direction and to allow the second and third color light beams to pass therethrough; the second mirror plane has a dichroic property to reflect the second color light beam in the second direction and to allow the third color light beam to pass therethrough; the third mirror plane has either a dichroic property or a total reflection property to reflect the third color light beam in the third direction; a third numerical aperture of an entire light composed of the first, second and third color light beams which are collected at the same position of the light valve, which is on a plane including an optical axis, the plane being in parallel with a plane optically corresponding to a reference plane formed by a normal line to the mirror planes and an optical axis of the color light beams immediately before an incidence onto the color separation optical system, is set to be approximately the same as first numerical apertures of the first, second and third color light beams collected at each portion on the light valve, the first numerical apertures being on a plane including the optical axis, which is the plane perpendicular to the plane optically corresponding to the reference plane.

In the above-described preferred aspect, since the first and third numerical apertures are set to be approximately equal, a divergent angle of the whole modulated light emitted from the light valve in a direction corresponding to the angle (formed by the mirror planes) will be approximately equal to a divergent angle of the whole modulated light in a direction perpendicular to a direction corresponding to the angle (formed by the mirror planes). Therefore, as is understood from the descriptions as to the aspect which was described earlier than this aspect, based on the peculiar structure of the foregoing color separation optical system, a bright projection image can be obtained compared to the conventional color separation optical system.

A projection type display apparatus of still another preferred aspect of the present invention comprises a color separation optical system which performs a color separation for a light from a light source to divide into first, second and third color light beams, thereby emitting the first, second and third color light beams in first, second and third directions which are different from each other; a light valve which receives the first, second and third color light beams emitted from the color separation optical system from three different directions corresponding to the first, second and third directions, thereby modulating the first, second and third color light beams; and a projection optical system which projects a modulated light by the light valve, wherein a first lens plate having a plurality of lenses, which divides the light from the light source into a plurality of light beams, is disposed between the light source and the color separation optical system; a second lens plate having a plurality of lenses, which superposes the light beams divided by the first lens plate onto the light valve, thereby illuminating the light valve with the superposed light beams, is disposed between the first lens plate and the color separation optical system; the color separation optical system includes first, second and third mirror planes sequentially arranged from a light incidence side so that the first, second and third mirror planes are perpendicular to a predetermined plane and form predetermined angles with each other; the first mirror plane has a dichroic property to reflect the first color light beam in the first direction and to allow the second and third color light beams to pass therethrough; the second mirror plane has a dichroic property to reflect the second color light beam in the second direction and to allow the third color light beam to pass therethrough; the third mirror plane has either a dichroic property or a total reflection property to reflect the third color light beam in the third direction; the color separation optical system performs a color separation for a light emitted from the second lens plate; a periphery of a region in the second lens plate, where the plurality of lenses are disposed, takes the shape in which a length in a fourth direction perpendicular to the optical axis is longer than that in a fifth direction perpendicular to the optical axis and the fourth direction; and the second lens plate is disposed so that the fourth direction is perpendicular to a plane optically corresponding to a reference plane formed by a normal line to the mirror planes and an optical axis immediately before an incidence to the color separation optical system.

The periphery of the region in the second lens plate may be, for example, a rectangular shape, an elliptical shape or the like.

The above-described preferred aspect is a concrete example of the two preferred aspects which were described earlier than this aspect. For the optical system illuminating the light valve, the periphery of the region in the second lens plate is devised using a so-called fly-eye lens composed of first and second lens plates as is disclosed in Japanese Patent Laid-Open No. 3-111806.

A projection type display apparatus of still another preferred aspect of the present invention comprises a color separation optical system which performs a color separation for a light from a light source to divide into first, second and third color light beams, thereby emitting the first, second and third color light beams in first, second and third directions which are different from each other; a light valve which receives the first, second and third color light beams emitted from the color separation optical system from three different directions corresponding to the first, second and third directions, thereby modulating the first, second and third color light beams; and a projection optical system which projects a modulated light by the light valve, wherein a rod integrator, which receives the light from the light source to emit it from its exit surface, is disposed between the light source and the color separation optical system, the exit surface being substantially a plane light source; a relay lens is disposed between the rod integrator and the light valve, the relay lens forming an image of the exit surface of the rod integrator on the light valve, thereby performing a critical illumination for the light valve; the color separation optical system has first, second and third mirror planes which are sequentially disposed from a light incidence side so that they are perpendicular to a predetermined plane and form predetermined angles with each other; the first mirror plane has a dichroic property to reflect the first color light beam in the first direction and to allow the second and third color light beams to pass therethrough; the second mirror plane has a dichroic property to reflect the second color light beam in the second direction and to allow the third color light beam to pass therethrough; the third mirror plane has either a dichroic property or a total reflection property to reflect the third color light beam in the third direction; the color separation optical system performs a color separation for an emergence light from the rod integrator; the relay lens has an aperture stop in its pupil position, an opening of the aperture stop having a shape in which a length in a fourth direction perpendicular to an optical axis is longer than that in a fifth direction perpendicular to the optical axis and the fourth direction; and the aperture stop is disposed so that the fourth direction is perpendicular to a plane optically corresponding to a reference plane which is formed by a normal line to the mirror planes and an optical axis immediately before an incidence onto the color separation optical system.

The above-described preferred aspect is a concrete example of the initial two preferred aspects. The opening shape of the aperture stop of the relay lens is devised using a rod integrator and a relay lens which performs a critical illumination, as an optical system illuminating a light valve.

BRIEF DESCRIPTION OF THE DRAWINGS

For a more complete understanding of the present invention and the advantages thereof, reference is now made to the following description taken in conjunction with the accompanying drawings.

FIG. 3 is a diagram showing the state of light beams in the projection type display apparatus of FIG. 1 more in detail, which is the diagram viewed in ⁻Z direction in FIG. 1.

DETAILED DESCRIPTION OF THE PREFERRED EMBODIMENTS

A projection type display apparatus of the present invention will be described with reference to the accompanying drawings in detail, below.

(First Embodiment)

First, a projection type display apparatus of a first embodiment of the present invention will be described with reference to FIGS. 1 to 7.

Figure 1:
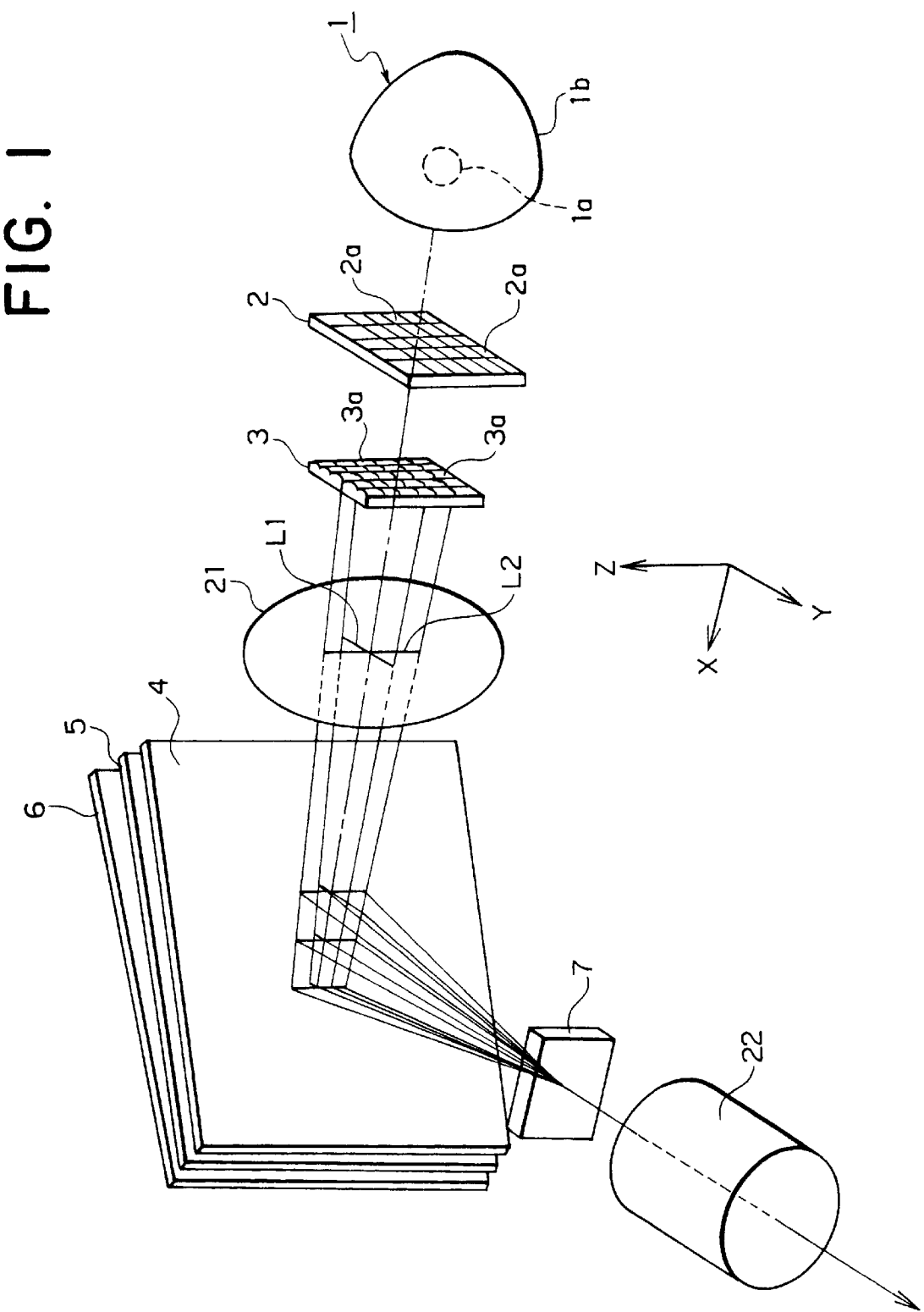
FIG. 1 is a schematic perspective view showing a projection type display apparatus of a first embodiment of the present invention.

FIG. 1 is a schematic perspective view showing a projection type display apparatus of the first embodiment of the present invention. In FIG. 1, states of light beams are also shown. It should be noted that for convenience of the descriptions, the X, Y and Z axis are defined as shown in FIG. 1 (in other drawings described later, the X, Y and Z axis are defined in the same manner as FIG. 1).

In the projection type display apparatus of this embodiment, the light source 1 is composed of the lamp 1a and the parabolic mirror 1b which is a concave mirror disposed at a rear portion of the lamp 1a. Because the parabolic mirror 1b is used as a concave mirror, a source light emitted from the light source 1 travels, as approximately a parallel light beam, in the X direction in parallel with an optical axis. Then the source light is caused to be incident onto a so-called fly-eye integrator composed of the first and second lens plates 2 and 3, which have a plurality of lenses 2a and 3a disposed on their respective surfaces on the optical axis.

In this embodiment, the lenses 2a on the first lens plate 2 and the lenses 3a on the second lens plate 3 are arranged in the same configuration. In this embodiment, the lenses 2a and 3a are arranged by 5 in row and by 6 in column and vice versa. The lenses 2a and 3a have different external shapes (contour shapes) i.e., lens shapes such as a curvature. This is because functions of the lenses 2a on the first lens plate 2 to be aimed at are different from those of the lenses 3a on the second lens plate 3 as described later.

The external shape of the effective lens area of the lenses 2a on the first lens plate 2 is a rectangle in proportion to an external shape of the effective display area of the light valve 7 having a later described rectangular shape. The ratio of the longitudinal and lateral lengths of the lenses 2a is the same as that of the light valve 7.

Moreover, the lens shape of the lenses 2a on the first lens plate 2 such as a curvature is determined so that a parallel light beam incident onto the lens 2a is collected at the lens 3a on the second lens plate 3 corresponding to that lens 2a. Specifically, the lens shape such as a curvature of the lenses 2a is determined so that the lens 3a corresponding to the lens 2a is located at the position of a focal distance of the lens 2a.

The lens 3a on the second lens plate 3 is determined so that a luminescent spot on the lens 2a on the first lens plate 2 corresponding to the lens 3a is allowed to form its image at a conjugated point on the light valve 7 that is a later-described illuminated body. Specifically, each of the lenses 2a on the first lens plate 2 can be regarded as a plane light source and the lens surface of the lens 2a will be magnifiably illuminated onto the light valve 7 by the corresponding 3a of the second lens plate 3, and the light valve 7 is illuminated by superposing the light beams from the lens surface by the number of the lenses 2a on the first lens plate 2.

As is understood from the above description, the first lens plate 2 separates the light from the light source into light beams of the number equal to that of the lenses 2a by the lenses 2a. The second lens plate 3 superposes the separated light beams on the light valve 7 and illuminates the valve 7.

In this embodiment, the total or contour shape of the second lens plate 3, that is, the shape of the region in the second lens plate 3 where the plurality of lenses 3a are disposed, is a rectangle in which the dimensional ratio of the longitudinal length (in the Z direction) to the lateral length (in the Y direction) is approximately 2:1. It should be noted that in the conventional fly-eye integrator, the shape of the second lens plate is a square. It should be noted that, in the present invention, the second lens plate 3 may have an elliptical shape having the line of apsides in the Z direction.

The light beam emitted from the lens 2a on the first lens plate 2 is collected at the lens 3a on the second lens plate 3 corresponding to the lens 2a, and emitted from the lens 3a. Thereafter, the light beam travels through the field lens 21, and then is incident onto the R light reflection dichroic mirror 4, the G light reflection dichroic mirror 5 and the B light reflection dichroic mirror 6 which composes the color separation optical system. The dichroic mirrors 4, 5 and 6 are sequentially arranged from the light incidence side on the optical axis so that they are perpendicular to the XY plane and form predetermined angles of several degrees with each other. The mirror surface of the R light reflection dichroic mirror 4 possesses the dichroic property to reflect the R light and to allow the G light and B light to pass therethrough. The mirror surface of the G light reflection dichroic mirror 5 possesses the dichroic property to reflect the G light and to allow the B light to pass therethrough. The mirror surface of the B light reflection dichroic mirror 6 possesses the dichroic property to reflect the B light. However, a total reflection mirror may be used instead of the B light reflection dichroic mirror 6. Moreover, the color separation optical system may be constituted by the combination of prisms each having a surface on which a dichroic film is formed so that it possesses an equivalent property to the color separation optical system.

The light beam of the R light wavelength region among the light beams incident onto the color separation optical system is reflected by the dichroic mirror 4, and is incident onto the light valve 7. The light of the G light beam wavelength region among the light beams passing through the dichroic mirror 4 is reflected by the dichroic mirror 5, and is incident onto the light valve 7 after passing through the dichroic mirror 4. The light beam of the B light wavelength region passing through the dichroic mirror 5 is reflected by the dichroic mirror 6, and is incident onto the light valve 7 after passing through the dichroic mirrors 5 and 4. The light beams which are incident onto the light valve 7 are modulated by the light valve 7 and are emitted therefrom. The emitted projection light is incident onto the projection lens 22 and is projected on a screen (not shown).

In order to describe the light beam reaching the light valve 7, as shown in FIG. 1, when the description of the light beam is made, the light beam is divided into the light beam L1 and the light beam L2, the light beam L1 appearing on the plane in parallel with the Y axis and including the optical axis and the light beam L2 appearing on the plane in parallel with the Z axis and including the optical axis. The light beams L1 and L2 are representatively picked up from the same light beam for convenience of the description.

A plane formed by normal lines to the dichroic mirrors 4, 5 and 6 and the optical axis immediately before an incidence onto the dichroic mirror 4, that is, immediately before an incidence onto the color separation optical system, the plane including the optical axis immediately before the incidence, is defined as a reference plane. In this embodiment, the reference plane is a plane in parallel with the XY plane, which includes the optical axis (in parallel with the X axis) immediately before the incidence onto the dichroic mirror 4. In this embodiment, since any portion of the optical axis is included in a plane in parallel with the XY plane, a plane optically corresponding to the reference plane is the XY plane in any portion of the optical axis. However, as in the case where for example, a bending mirror for bending the optical axis in the ⁻Z direction is inserted between the dichroic mirror 4 and the light valve 7, when the optical axis is three dimensional, planes optically corresponding to the reference plane are different in respective sections of the optical axis. The plane optically corresponding to the reference plane is a plane equivalent to the reference plane when the optical axis is developed in the form of a straight line so as to make the optical axis optically equivalent.

According to such definition, the light beam L1 is the one in parallel with a plane optically corresponding to the reference plane, which appears on a plane including the optical axis. The light beam L2 is the one perpendicular to a plane optically corresponding to the reference plane, which appears on a plane including the optical axis. Moreover, the second lens plate 3 is disposed so that the longitudinal direction (Z direction) of the long side of the whole shape of the rectangle is perpendicular to the plane optically corresponding to the reference plane.

Figure 2A:
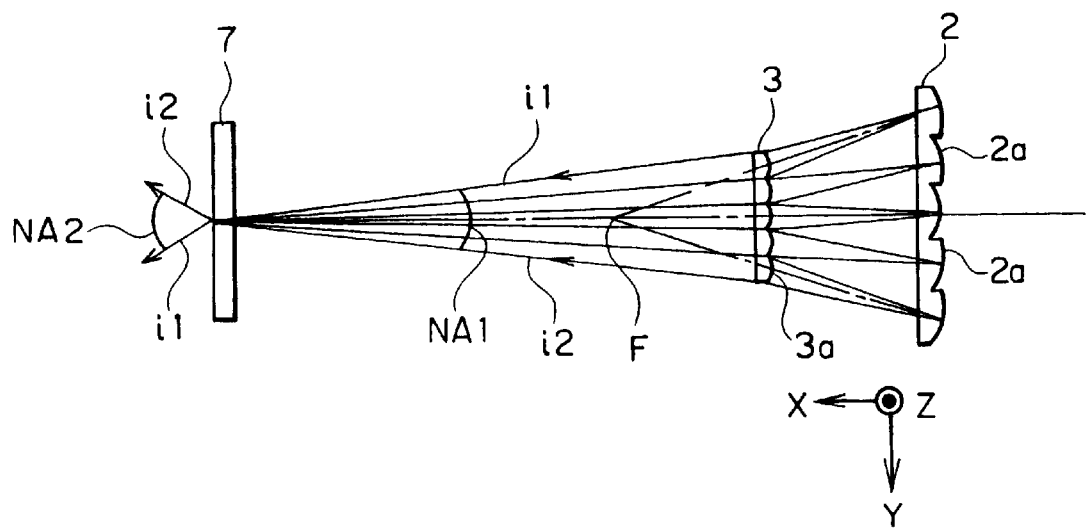
FIG. 2A is a diagram showing light beams viewed in a $-Z$ direction in FIG. 1.
Figure 2B:
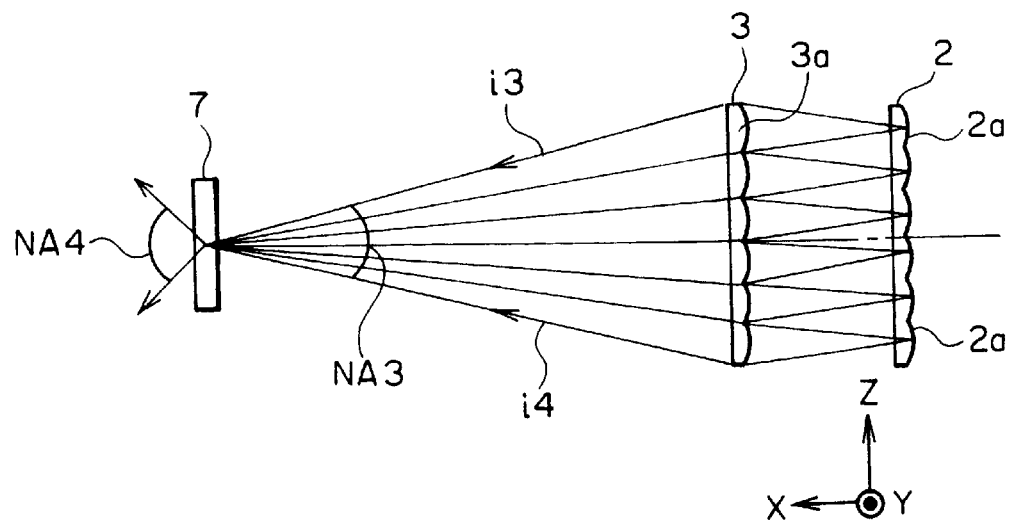
FIG. 2B is a diagram showing light beams viewed in $-Y$ direction.

Here, the diagrams showing the state in which the light travelling through the first and second lens plates 2 and 3 reaches the light valve 7 are shown in FIGS. 2A and 2B. The diagrams shown in FIG. 2A and 2B will be described in detail. For convenience of the description, since in FIGS. 2A and 2B, illustrations of the light source 1, the field lens 21, and the color separation optical system 4, 5 and 6 are omitted, one light among the R, G and B color lights is illustrated. FIG. 2A is a diagram showing the light beam L1 viewed in the ⁻Z direction in FIG. 1, and FIG. 2B is a diagram showing the light beam L2 viewed in the ⁻Y direction in FIG. 1.

As shown in FIG. 2A, as is understood from the descriptions for the first and second lens plates 2 and 3, the image of the light beam emitted from the luminous point of each lens 2a of the first lens plate 2 is formed at the conjugated point on the light valve 7 by the corresponding lens 3a on the second lens plate 3, thereby achieving a critical superposing illumination for the light valve 7. The rays of light i1 and i2 in FIG. 2A show the outermost ones, and the angle formed by the rays of light i1 and i2 constitute the numerical aperture NA1 of the light beam L1 for illuminating the light valve 7. As is understood from this description, this numerical aperture NA1 is determined by the length of the shorter side of the second lens plate 3 and the distance between the second lens plate 3 and the light valve 7. As is described later, the light beam having the numerical aperture NA1, which is incident onto the light valve 7, travels through the micro lens array 30, which constitutes the light valve 7, and the liquid crystal display panel 40, and then is emitted as a projection light having the numerical aperture NA2 shown in FIG. 2A.

As is apparent from FIG. 2A, the first lens plate 2 wholly exhibits a positive refraction power. When consideration for each of the lenses 2a of the first lens plate 2 is omitted, the first lens plate 2 functions to wholly converge the light beam L1 to the point F. When consideration for each of the lenses 3a of the second lens plate 3 is omitted, the second lens plate 3 wholly exhibits a negative refraction power, and the second lens plate 3 functions to wholly converge the light beam L1 on the light valve 7. As a result, as to the light beam L1, the refraction power of the first lens plate 2 is larger than that of the second lens plate 3. Specifically, as is described below, the numerical aperture of the light beam L1 is made smaller than that of the light beam L2, whereby the whole of the numerical apertures at the time when the light beam L1 is incident onto the light valve 7 after the color separation is made approximately equal to the numerical aperture of the light beam L2.

FIG. 2B is a diagram viewed in the ⁻Y direction in FIG. 1. Since as described above, the height of the second lens plate 3 is approximately twice as long as its width, the length of the longer side of the second lens plate 3 shown in FIG. 2B is approximately twice as long as the length of its shorter side shown in FIG. 2A.

As shown in FIG. 2B, each luminous point of the lenses 2a on the first lens plate 2 is caused by the lens 3a of the corresponding second lens plate 3 to form its image on the light valve 7, thereby achieving a superposing illumination for the light valve 7. The rays of light i3 and i4 in FIG. 2B show the outermost ones, and an angle formed by the rays of light i3 and i4 constitutes the numerical aperture NA3 of the light beam L2. This numerical aperture NA3 is determined by the length of the longer side of the second lens plate 3 and the distance between the second lens plate 3 and the light valve 7. Therefore, the numerical aperture NA3 is larger than the numerical aperture NA1. As described later, the light beam having the numerical aperture NA3, which is incident onto the light valve 7, passes through the light valve 7, and is emitted as a projection light having the numerical aperture NA4 shown in FIG. 2B.

As is clear from the FIG. 2B, the first lens plate 2 has almost a zero refraction power as a whole. If the function of each of the lenses 2a is neglected, the first lens plate 2 has no function to converge the whole of the light beam L2. If the function of each of the lenses 3a is neglected, the second lens plate 3 has a positive refraction power as a whole, and the second lens plate 3 has a function to converge the whole of the light beam L2 from the first lens plate 2 onto the light valve 7. As a result, with regard to the light beam L2, the refraction power of the first lens plate 2 is set to be smaller than that of the second lens plate 3. Specifically, as described below, the numerical aperture of the light beam L2 can be set to be larger than that of the light beam L1, and the numerical aperture of the whole of the light beam L1, at the time when the light beam L1 is actually incident onto the light valve 7 after having been subjected to the color separation, can be set to be approximately equal to the numerical aperture of the light beam L2.

In the above description, although with respect to the light beam L1, the refractive power of the first lens plate 2 is set to be larger than that of the second lens plate 3 and, with respect to the light beam L2, the refractive power of the first lens plate 2 is set to be smaller than that of the second lens plate 3, if with respect to the light beam L1, the difference of the refractive power of the first lens plate 2 for the second lens plate 3 is set to be relatively larger than the power difference of the first lens plate L2, with respect to the light beam L2, for the second lens plate 3, the whole of the numerical aperture of the light beam L1, at the time when the light beam L1 is incident onto the light valve 7 after the color separation of the light beam L1, can be set approximately equal to the numerical aperture of the light beam L2.

Figure 4:
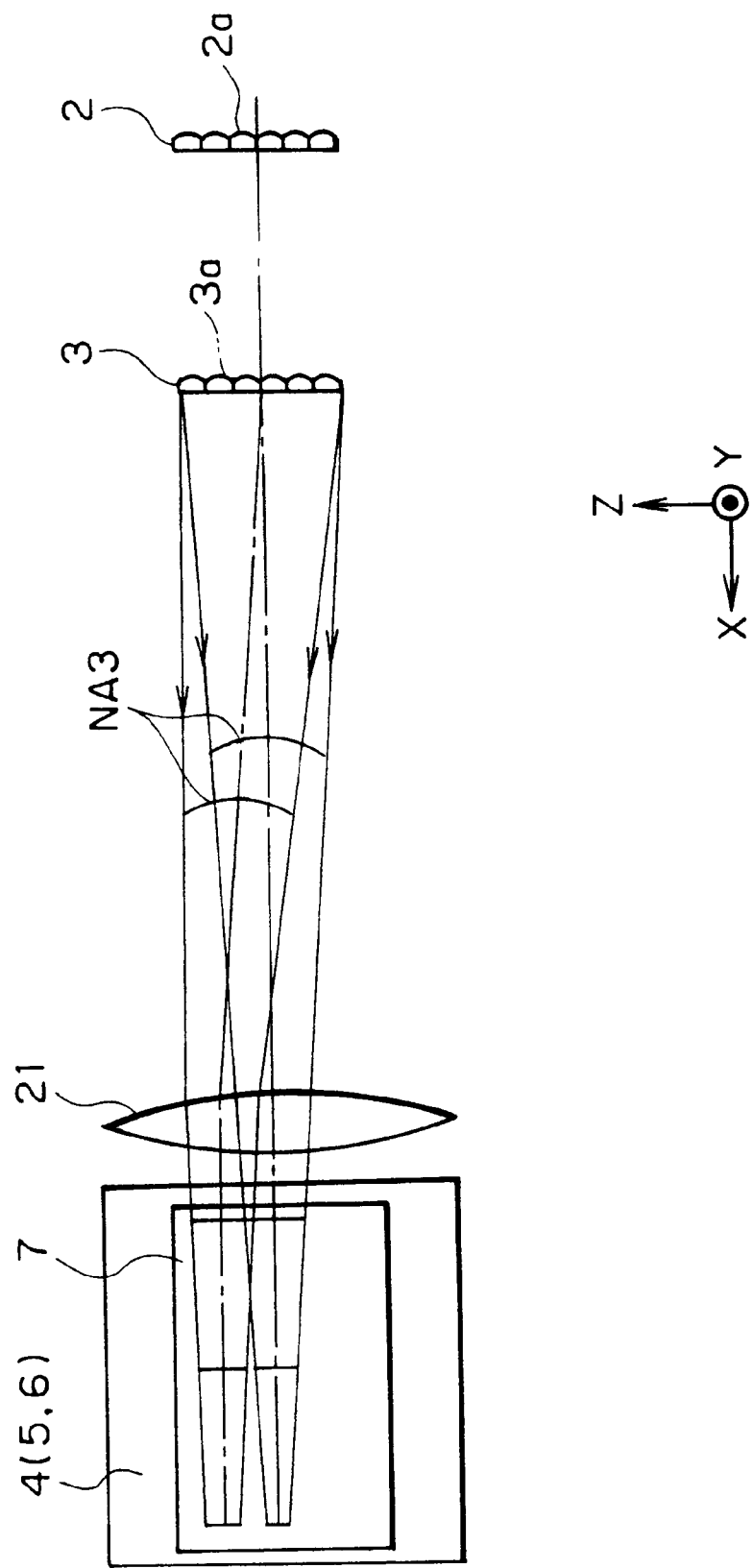
FIG. 4 is a diagram showing the state of light beams in the projection type display apparatus of FIG. 1 more in detail, which is the diagram viewed in ⁻Y direction in FIG. 1.

FIGS. 3 and 4 are diagrams of the projection type display apparatus according to this embodiment in which the field lens 21, the color separation optical system 4, 5 and 6, and the projection lens 22 as the projection optical system are added to the display apparatus of FIGS. 2A and 2B. FIG. 3 is a diagram showing the foregoing light beam L1 viewed in the ⁻Z direction in FIG. 1. FIG. 4 is a diagram showing the foregoing light beam L2 viewed in the ⁻Y direction in FIG. 1. It should be noted that an illustration of the projection lens 22 is omitted in FIG. 4. Moreover, it should be noted that in FIGS. 3 and 4, the light beam deviated from the optical axis is also shown in addition to that on the optical axis.

Referring to FIG. 3, the light beam L1 on the optical axis emitted from the second lens plate 3 travels with the numerical aperture NA1 as shown in FIG. 2A, and is incident onto the color separation optical system composed of the dichroic mirrors 4, 5 and 6 via the field lens 21. The R light beam is reflected by the dichroic mirror 4 and is collectively incident onto the light valve 7 with the numerical aperture NA1. Similarly, the G light is reflected by the dichroic mirror 5 and is collectively incident onto the light valve 7 with the numerical aperture NA1. Similarly, the B light is reflected by the dichroic mirror 6 and is collectively incident onto the light valve 7 with the numerical aperture NA1.

The respective inclination angles of the dichroic mirrors 4, 5 and 6 are determined so that the numerical aperture NA5 (formed by the light rays i5 and i6 in the outermost sides in FIG. 3) of the light beam L1 of the whole of the mixed light composed of each color which is subjected to the color separation by the respective color separation optical system 4, 5 and 6, and travels and converges to the same position on the light valve 7 with the numerical aperture NA1 is approximately in agreement with the numerical aperture NA3 of the light beam L2 in FIG. 2B. The light beam L1 which has the numerical aperture NA1 as a single color light and has the numerical aperture NA5 (approximately equal to the numerical aperture NA3) as the whole of the mixed light, is exited from the light valve 7 as the projection light, which has the numerical aperture NA2 as each color and has the numerical aperture NA6 as the whole of the mixed light beam. Since the numerical aperture NA5 is approximately in agreement with the numerical aperture NA3, the numerical aperture NA6 is also approximately in agreement with the numerical aperture NA4.

In FIG. 3, the two light beams deviated from the optical system are also illustrated. Each of the off-axis light beams has the numerical aperture NA1, and each principal ray of each of the light beams is made in parallel with the optical axis by the field lens 21, specifically, each of the off-axis light beams is incident onto the respective color separation optical systems 4, 5 and 6 so that each of the light beams maintains its telecentric property. Similar to the foregoing light beam on the optical axis, the off-axis light beam of the whole of the each color, is collected to the corresponding position on the light valve 7 with the numerical aperture NA5, and is exited from the light valve 7 with the numerical aperture NA6.

FIG. 4 shows a diagram viewed in the ⁻Y direction. The light beam L2 emitted from the second lens plate 3 travels with the numerical aperture NA3 as shown in FIG. 2B, and is subjected to the color separation by the color separation optical systems 4, 5 and 6, thus being separated into each color. Each color light beam advances with the numerical aperture NA3 in the Y direction perpendicular to the paper plane in FIG. 4. Each color light beam is collected at the predetermined position on the light valve 7, and is exited from the light valve 7 with the numerical aperture NA4.

Here, the states of the light valve 7 and the light around the light valve 7 will be described with reference to FIGS. 5 to 7.

Figure 5:
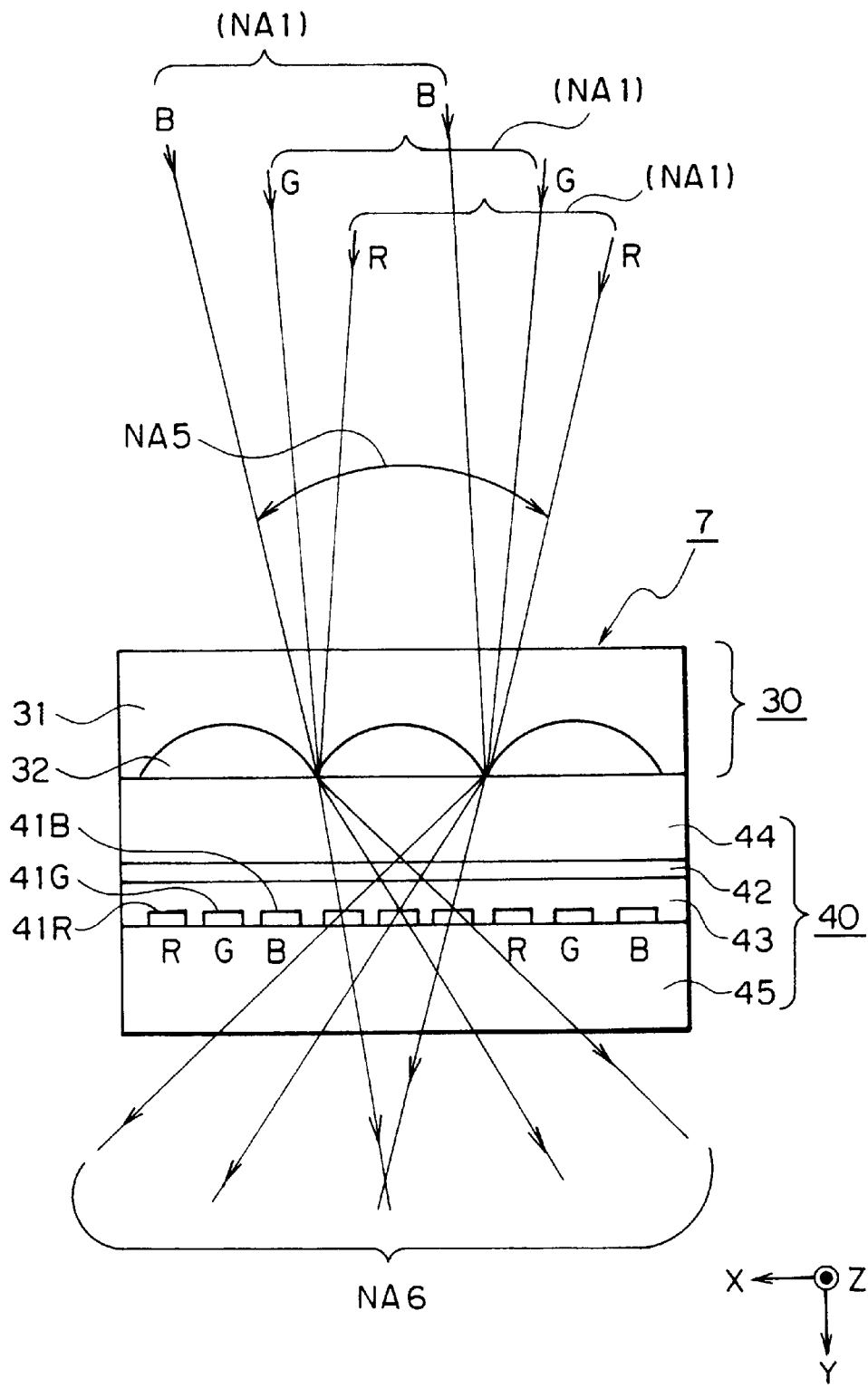
FIG. 5 is a schematic section view of a light valve in FIG. 1.

FIG. 5 is a schematic section view of the light valve 7 viewed in the ⁻Z direction, which is obtained by cutting the light valve 7 shown in FIG. 1, along a plane in parallel with the XY plane. In FIG. 5, the state of the foregoing light beam L1 near the light valve 7 is also shown.

In the embodiment, the light valves 7 is constituted by adhering the micro lens array 30 and the liquid crystal display panel 40. As shown in FIG. 5, the micro lens array 30 is formed by arranging the micro lenses 32 on the substrate 31 in an array fashion. The liquid crystal display panel 40 is composed of the glass substrate 44, the counter electrode 42 formed of an ITO film, the liquid crystal layer 43 which is disposed on an interposing orientation film not illustrated, the R light pixel electrode 41R, the G light pixel electrode 41G, the B light pixel electrode 41B each of which pixel electrode is formed of, for example, an ITO film and arranged in a matrix fashion on an interposing orientation film not illustrated, and the glass substrate 45. Each of the color light pixel electrodes 41R, 41G and 41B, and the liquid crystal layer 43 and the counter electrode 42 which correspond to each pixel electrode constitute the pixel for each color. It should be noted that in FIG. 5, the polarization plate, the orientation film and the like are omitted which are the constitutional components of the liquid crystal panel 40, similar to FIG. 6 described later.

Figure 7:
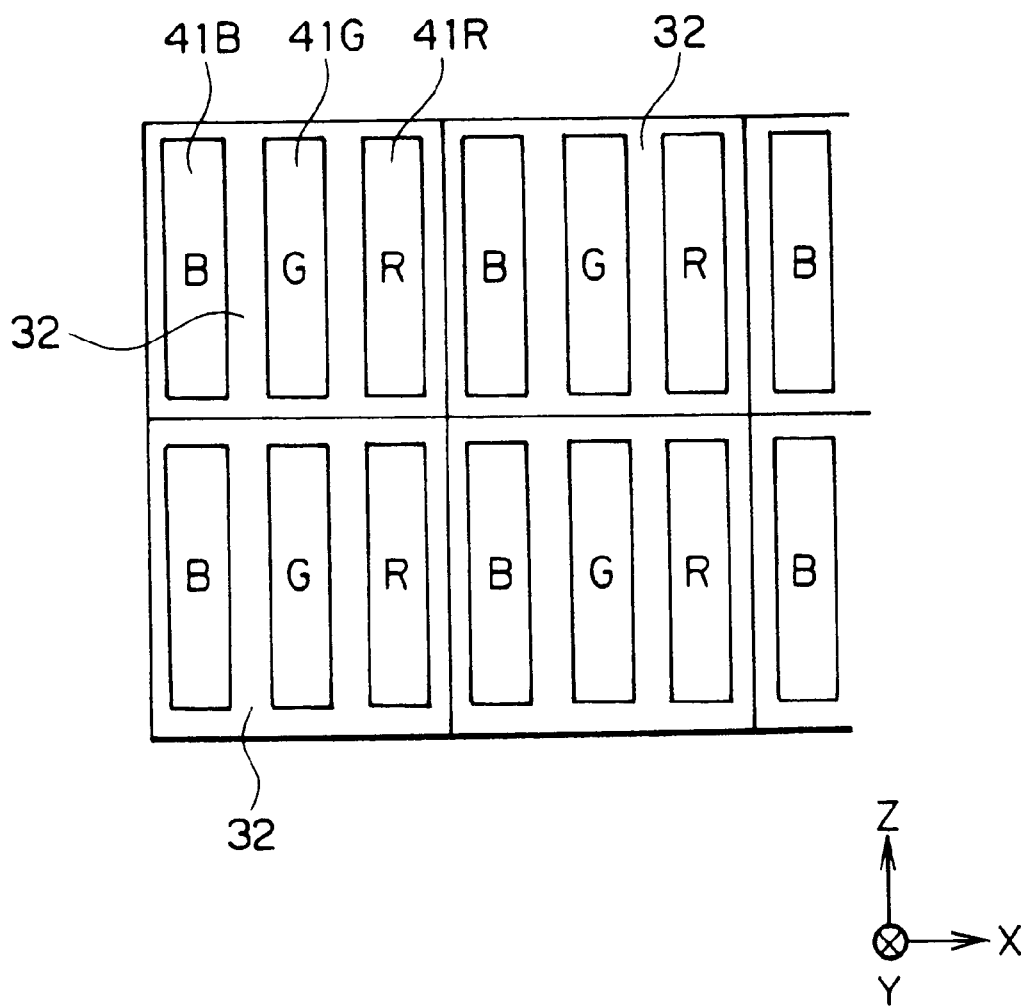
FIG. 7 is a diagram showing a shape of a pixel for each color of the light valve in FIG. 1 and an external shape of a micro lens in FIG. 1.

In FIG. 7, the color light signal electrodes 41R, 41G and 41B and the micro lenses 32 viewed from the surface (viewed in the Y direction) are shown. As shown in FIG. 7, the color light pixel electrodes 41R, 41G and 41B are in the form of a rectangle. The external shape of the micro lenses 32 are in the form of approximately a square. Each of the R, G and B light pixel electrodes is disposed on one micro lens 32, which serve as a pixel for each color.

Referring to FIG. 5 again, as described formerly, the light beam L1 of the B, G and R light is incident onto the opening portion of a micro lens 32 of the micro lens array member 30 at a predetermined incidence angle, which has the numerical aperture NA1 as the light beam of each color and the numerical aperture NA5 as that of the entirety of colors (approximately equal to the numerical aperture NA3). Moreover, with respect each of the incidence light on the micro lens 32, the R light beam is collected at the R light pixel formed with the electrode 41R by the micro lens 32, the G light beam is collected at the G light pixel formed with the electrode 41G, and the B light beam is collected at the B light pixel formed with the electrode 41G, with the numerical aperture NA2. Each of the light beams is emitted from the light valve 7 with the numerical aperture NA2. The light beam L1 is emitted with the numerical aperture NA6 (approximately equal to the numerical aperture NA4) as a whole, and the diffuse light beam is incident onto the projection lens 22.

Figure 6:
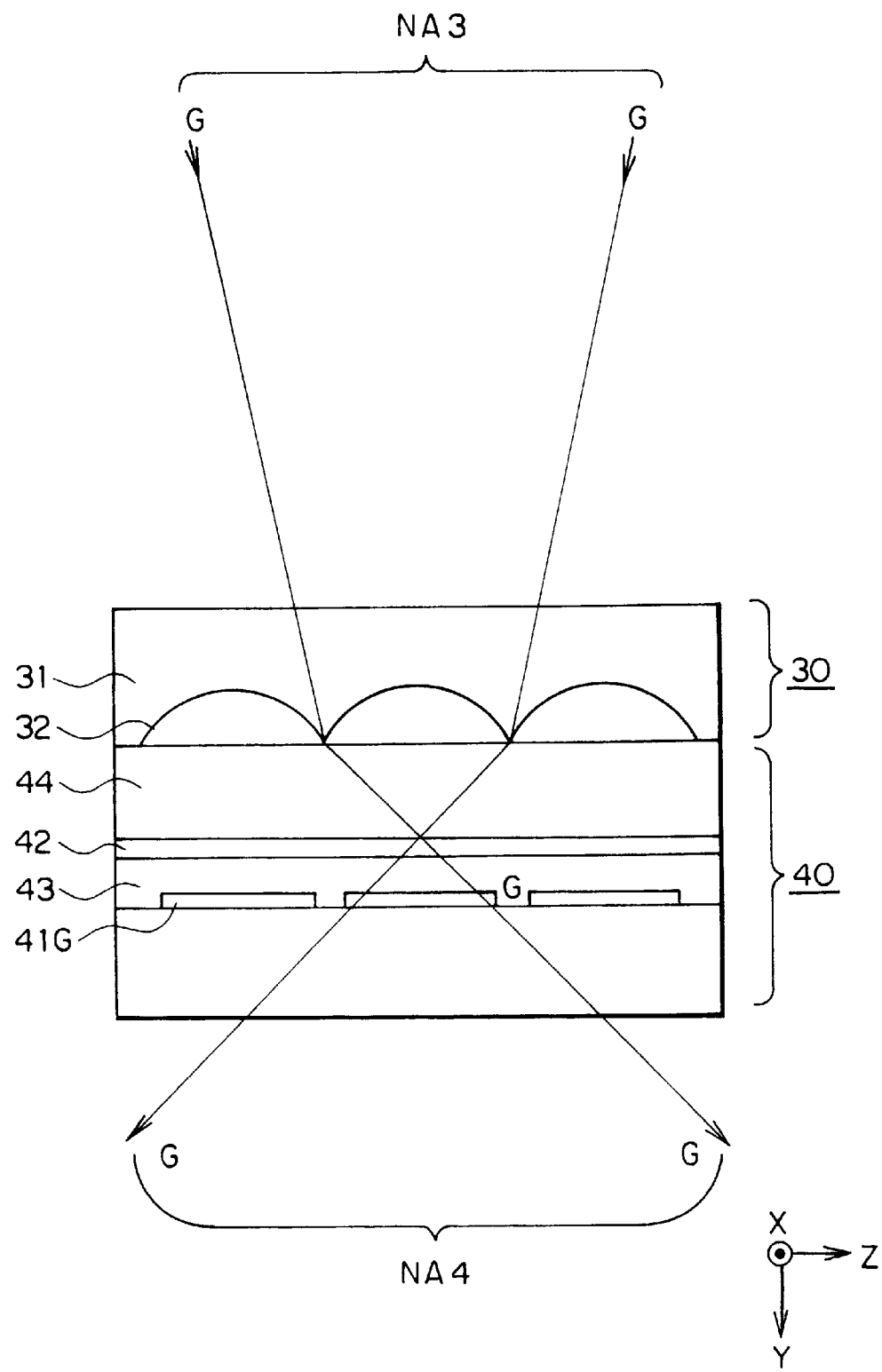
FIG. 6 is another schematic section view of a light valve in FIG. 1.

FIG. 6 is a schematic section view of the light valve 7 viewed in the ⁻X direction, in which the light valve 7 shown in FIG. 1 is cut along a plane in parallel with the YZ plane. In FIG. 6, the state of the foregoing light beam L2 near the light valve 7 is also shown. When viewed from the ⁻X direction, as is apparent from the former description, since the light beam L2 of each color having the same numerical aperture NA3 seems to be superposed, the description for the G light beam disposed in the middle position among the R, G and B light beams is made, in FIG. 6. The G light beam which is incident onto a micro lens 32 with the numerical aperture NA3 on the YZ plane and with the numerical aperture NA1 on the XY plane is incident onto a color light pixel electrode 41G. It should be noted that the R light and B light show the same operation as the G light. As described above, each of the electrodes 41R, 41G and 41B is in the form of a rectangle. In this embodiment, since each color light beam can be incident onto a pixel with the large numerical aperture NA3, it is understood that a bright illumination can be achieved all over its longitudinal direction. Moreover, each incidence light beam can be emitted from the light valve 7 with the numerical aperture NA4, so that it can be incident onto the projection lens 22 as a light beam having the same numerical aperture as the numerical aperture NA6 of the foregoing light beam L1 of the whole of the colors.

According to the suggestion of the conventional projection type display apparatus, if a projection type display apparatus similar to the projection type display apparatus is constituted, a second lens plate in the form of a square as an external shape having sides which are the shorter side of the second lens plate 3 of FIG. 1 shall be used in stead of the second lens plate 3 of FIG. 1 and the first lens plate 2 shall be inevitably substituted with a small sized one from the foregoing relation between the first and second lens plates 2 and 3. In this case, each color light beam shown in FIG. 6 will be incident with the numerical aperture NA1 of a small value, and it is impossible to illuminate the pixels brightly throughout the longitudinal direction (Z direction), so that a bright light can not be emitted.

In this embodiment, the projection lens 22 is designed and manufactured so that the projection lens 22 has an aperture stop having a circular opening therein and the incidence light can be emitted with the foregoing numerical aperture NA4 by means of this aperture stop, whereby the light beams L1 and L2 having the same numerical aperture can be incident and emitted. Thus, it is possible to project a bright light.

In the foregoing projection type display apparatus constituted according to the conventional projection type display apparatus, if the projection lens 22 were manufactured so that it can project a light beam having the numerical aperture NA4 of the incidence light beam, a light beam having the numerical aperture NA2 of the incidence light beam onto the light valve 7 can only be incident with respect to the foregoing light beam L1. As a result, it is impossible to project a bright light.

It should be noted that in this embodiment, the second lens plate 3 is in the form of a rectangle in which the ratio of the longitudinal side to the lateral side is 2:1. This is because the angles formed by the foregoing plurality of dichroic mirrors 4, 5 and 6 are determined so that the light beams L1 and L2 can be effectively incident onto the projection lens 22 by making the numerical apertures NA3 and NA5 of the light beams L2 and L1 the same as possible, the numerical aperture NA3 and NA5 being determined by the lengths of the shorter and longer sides of that rectangle and the numerical aperture NA5 being the whole of each color light separated by the foregoing color separation optical system. This object can also be achieved if the ratio of the longitudinal length to the lateral length of the second lens plate 3 were changed and the angles formed by the dichroic mirrors 4, 5 and 6 were changed. Therefore, it is unnecessary to limit the dimension ratio of the second lens plate 3 to 2:1.

It should be noted that as is apparent from the above-described description, in this embodiment, the numerical aperture NA3 is set to be larger than the numerical aperture NA1 and the numerical aperture NA5 is set to be approximately equal to the numerical aperture NA3. The foregoing numerical aperture NA3 is the one of the light beams collected at each position on the light valve 7, which are formed of respective light beams of the R, G and B light, and is the one on the plane perpendicular to the plane (XY plane) optically corresponding to the foregoing reference plane (XY plane), which includes the optical axis. The foregoing numerical aperture NA1 is the one of the light beams collected at the positions on the light valve 7, which are formed of respective light beams of the R, G and B light, and is the one on the plane in parallel to the plane (XY plane) optically corresponding to the foregoing reference plane (XY plane), which includes the optical axis. The foregoing numerical aperture NA5 is the one of the whole of the light beams (the foregoing mixed light beam), which are composed of the light beam of the R light which is incident onto the predetermined position of the light valve 7, the light beam of the G light which is incident onto the same position as the predetermined position on the light valve 7, and the light beam of the B light which is incident onto the same position as the predetermined position on the light valve 7. The numerical aperture NA5 is also the numerical aperture in the plane in parallel with the plane (XY plane) optically corresponding to the foregoing reference plane (XY plane), which includes the optical axis.

(Second Embodiment)

Next, a projection type display apparatus of a second embodiment of the present invention will be described with reference to FIGS. 8 to 10.

In the projection type display apparatus of the first embodiment, by devising the shape of the second lens plate 3 constituting a so-called fly-eye integrator, it is possible to achieve a bright illumination. In this embodiment, a projection type display apparatus is employed, which uses the rod integrator 8 and the relay lens 23.

Figure 8:
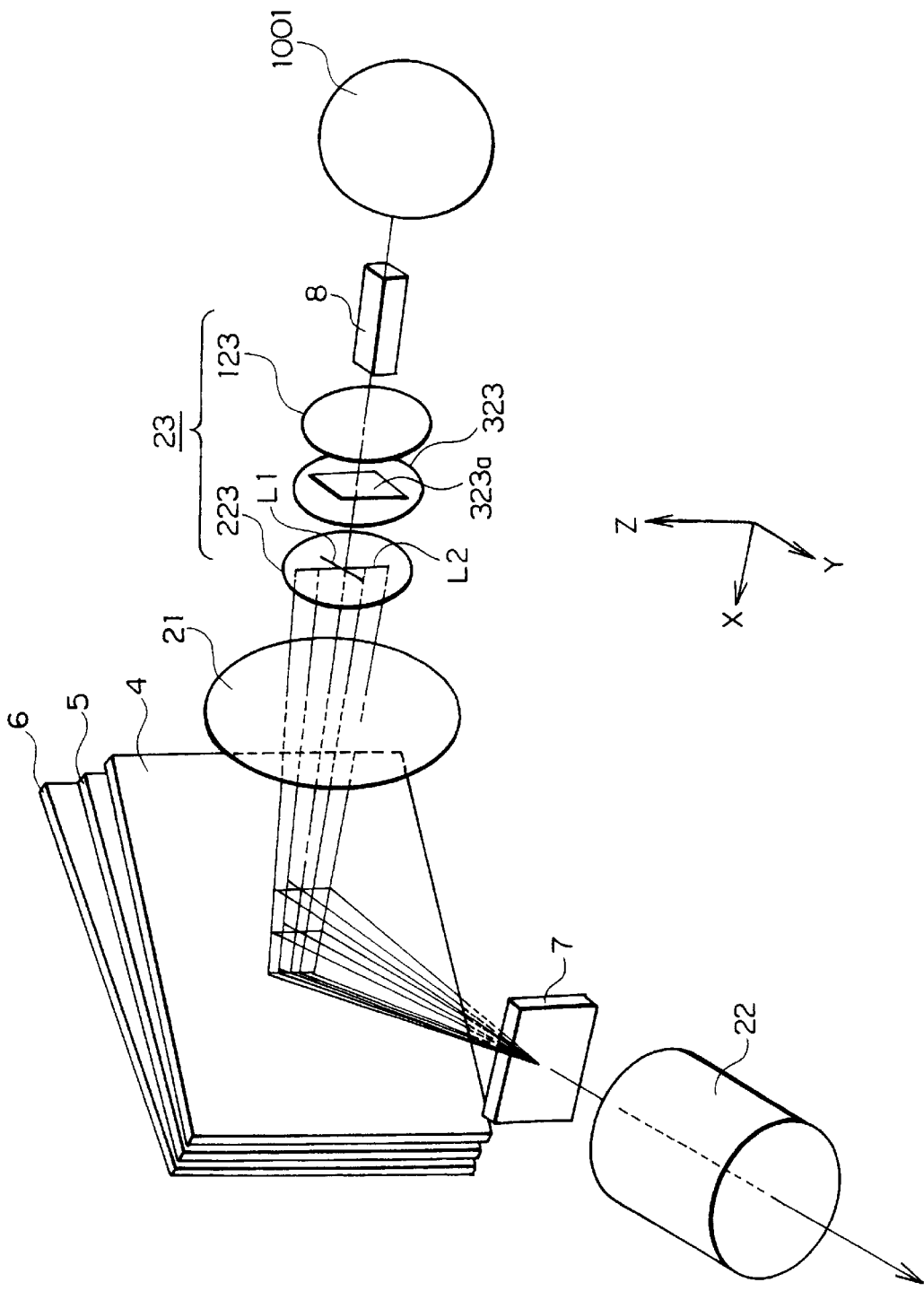
FIG. 8 is a schematic perspective view showing a projection type display apparatus of a second embodiment of the present invention.

FIG. 8 is a schematic perspective view showing the projection type display apparatus of this embodiment. Also in this embodiment, similar to the first embodiment, the X, Y and Z axes which are respectively orthogonal are defined as is illustrated in FIG. 8. Moreover, the same components in the projection type display apparatus as those in the first embodiment are denoted by the same reference symbols.

In the projection type display apparatus of this embodiment, the light source 1001 consists of a lamp not illustrated and an ellipsoidal mirror that is a concave mirror disposed on the rear surface of the lamp. Because the lamp is disposed at a first focal point of the ellipsoidal mirror, a light source light emitted from the light source 1001 advances so that it collects at a second focal point.

The incidence surface of the rod integrator 8 formed of a transparent optical member such as optical glass is disposed at the second focal point. The rod integrator 8 is in the form of a rectangular prism having a predetermined length, the section of which is in the form of a rectangle in proportion to the external shape of the effective display area of the light valve 7.

The source light incident onto the rod integrator 8 exits from the emission surface thereof facing the incidence surface, while repeating a total reflection within its internal surface. Therefore, a plane source light offering a uniform light intensity distribution is formed on the emission surface of the rod integrator 8. In other words, this emission surface is superposably illuminated by virtual images from a plurality of light sources, which are formed at the position of the incidence surface of the rod integrator 8 by the total reflection, and the emission surface of the rod integrator 8 will serve as a uniform surface light source as described above.

The light exited from the emission surface of the rod integrator 8 is incident onto the relay lens 23 composed of the front group lens 223, the rear group lens 123, and the aperture stop 323 disposed at a pupil position. The light exited from the relay lens 23 is incident via the field lens 21 onto the color separation optical system composed of the R light reflection dichroic mirror 4, the G light reflection dichroic mirror 5 and the B light reflection dichroic mirror 6, which is the same configuration as that of the first embodiment. Each color light obtained by separating the light incident on by the color separation optical system travels in a predetermined direction, and is incident onto the light valve 7. The relay lens 23 forms an image of the emission surface of the rod integrator 8 on the light valve 7, and performs a critical illumination against the light valve 7. The light beam incident onto the light valve 7 is modulated by the light valve 7, and is emitted therefrom. The emitted projection light is incident onto the projection lens 22 and is projected on a screen (not shown).

In this embodiment, the aperture stop 323 of the relay lens 23 has a rectangle opening 323a in which a ratio of a longitudinal dimension to a lateral dimension is approximately 2:1. In this embodiment, the opening 323a may be in the shape of a long circle such as an ellipse.

Also in the description of the this embodiment, similar to the foregoing first embodiment, in order to describe the light beam incident onto the light valve 7, as shown in FIG. 8, the description for this light beam is performed by dividing it into the light beam L1 appearing on the plane in parallel with the Y axis, which includes the optical axis, and the light beam L2 appearing on the plane in parallel with the Z axis, which includes the optical axis. The light beams L1 and L2 are representatively picked up from the same light beam for convenience of the description.

As described in the foregoing first embodiment, a plane formed by normal lines to the dichroic mirrors 4, 5 and 6 and the optical axis immediately before an incidence onto the dichroic mirror 4, that is, immediately before an incidence onto the color separation optical system, the plane including the optical axis immediately before the incidence, is defined as a reference plane. The plane optically corresponding to the reference plane is a plane equivalent to the reference plane when the optical axis is developed in the form of a straight line so as to make the optical axis optically equivalent.

According to such definition, the light beam L1 is the one in parallel with a plane optically corresponding to the reference plane, which appears on a plane including the optical axis. The light beam L2 is the one perpendicular to a plane optically corresponding to the reference plane of the light beam, which appears on a plane including the optical axis. Moreover, the aperture stop 323 of the relay lens 23 is disposed so that the longitudinal direction (Z direction) of the long side of the rectangle-shaped opening 323a of the aperture stop 323 is perpendicular to the plane (XY plane) corresponding to the reference plane.

Figure 9:
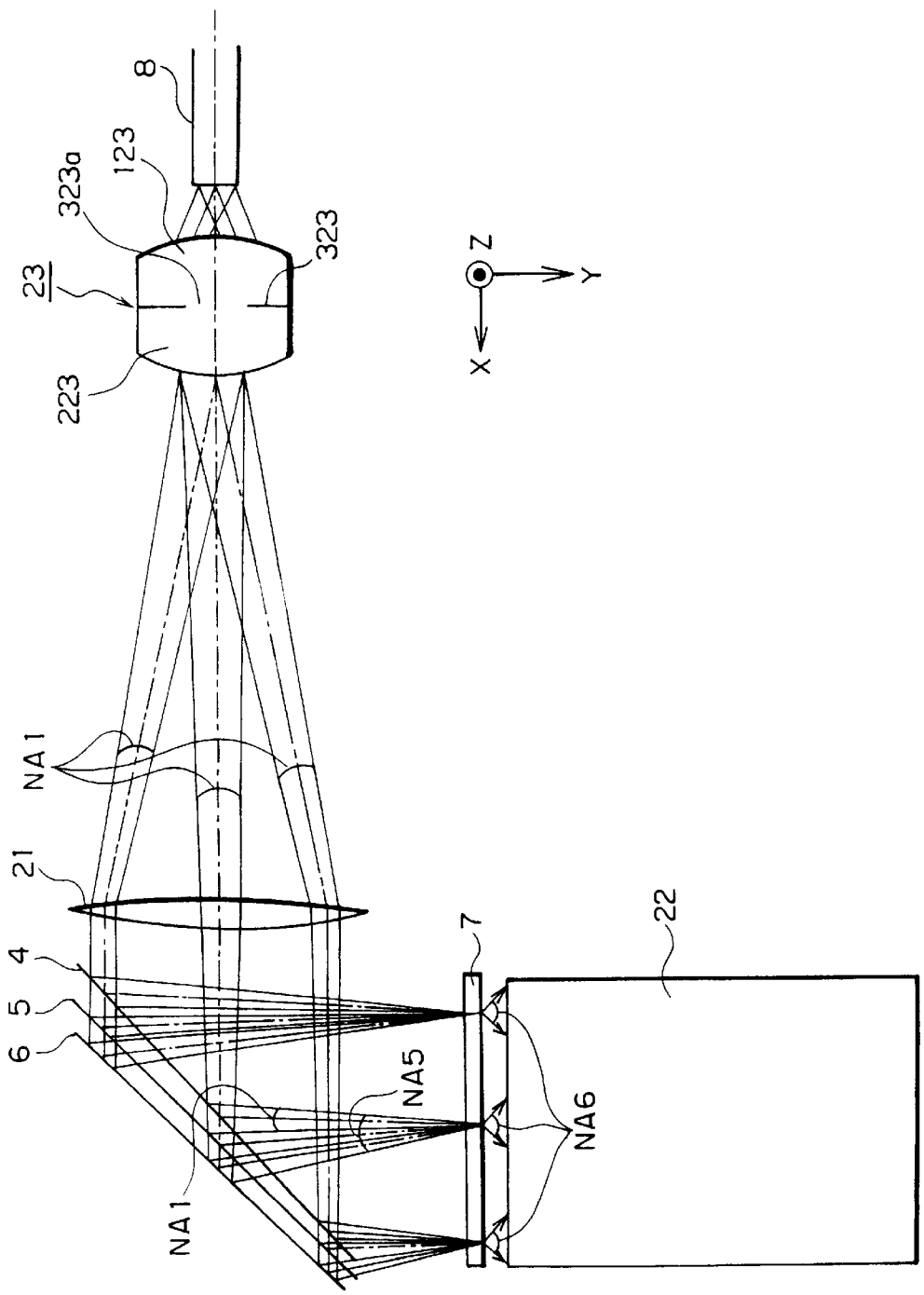
FIG. 9 is a diagram showing states of light beams in the projection type display apparatus shown in FIG. 8, which is the diagram of the light beams viewed in a ⁻Z direction in FIG. 8.

FIG. 9 is a diagram of the projection type display apparatus of this embodiment, which is a diagram showing the foregoing light beam L1 viewed in the ⁻Z direction in FIG. 8. As shown in FIG. 9, the light beam L1 emitted from the luminous point on the optical axis which is at the central portion on the emission surface of the rod integrator 8 is incident onto the relay lens 23, and exits from the relay lens 23 with the numerical aperture NA1 determined by the shorter side length of the opening 323a of the aperture stop 323 of the relay lens 23. The light beam L1 is collected on the optical axis of the light valve 7.

The constitution of this embodiment is the same as that of the first embodiment, in which each color light beam has the numerical aperture NA1, and the inclination angles of the dichroic mirrors 4, 5 and 6 constituting the respective color separation optical system are determined so that the numerical aperture NA5 of the light beam composed of each color subjected to the color separation by the color separation optical system 4, 5 and 6 is approximately in agreement with the numerical aperture NA3 described hereinafter.

The light beam L1 emitted from the luminous point disposed at the upper portion of the emission surface of the rod integrator 8 shown in FIG. 9 is incident onto the relay lens 23, and advances from the relay lens 23, while deviating in the Y direction from the optical axis with the numerical aperture NA1. The principal ray thereof is made in parallel with the optical axis by the field lens 71, and is incident onto the color separation optical system 4, 5 and 6. Each color light beam which has been subjected to the color separation by the respective color separation optical system 4, 5 and 6 has the numerical aperture NA1. The light beam of the whole of each color has the numerical aperture NA5, and is collected at the position closest to the X side on the light valve 7 (the left side in FIG. 9). The light beam is emitted from the light valve 7 with the numerical aperture NA6.

The light beam emitted from the luminous point disposed at the lower portion of the emission surface of the rod integrator 8 shown in FIG. 9 is incident onto the relay lens 23, and advances from the relay lens 23, while deviating in the ⁻Y direction from the optical axis with the numerical aperture NA1. The principal ray thereof is made in parallel with the optical axis by the field lens 21, and is incident onto the color separation optical system 4, 5 and 6. Each color light beam which has been subjected to the color separation by the respective color separation optical system 4, 5 and 6 has the numerical aperture NA1. The light beam of the whole of each color has the numerical aperture NA5, and is collected at the position closest to the ⁻X side on the light valve 7 (the right side in FIG. 9).

The light beam L1 as described above, which has the numerical aperture NA1 as each color light incident onto the light valve 7, has the numerical aperture NA5 as a light beam of the whole of each color as described above. The light beam L1 is emitted from the light valve 7 as a projection light, which has the numerical aperture NA2 as each color (not shown) and has the numerical aperture NA6 as a light beam of the whole of each color, similar to the description as to the first embodiment of FIG. 5, and is incident onto the projection lens 22.

Figure 10:
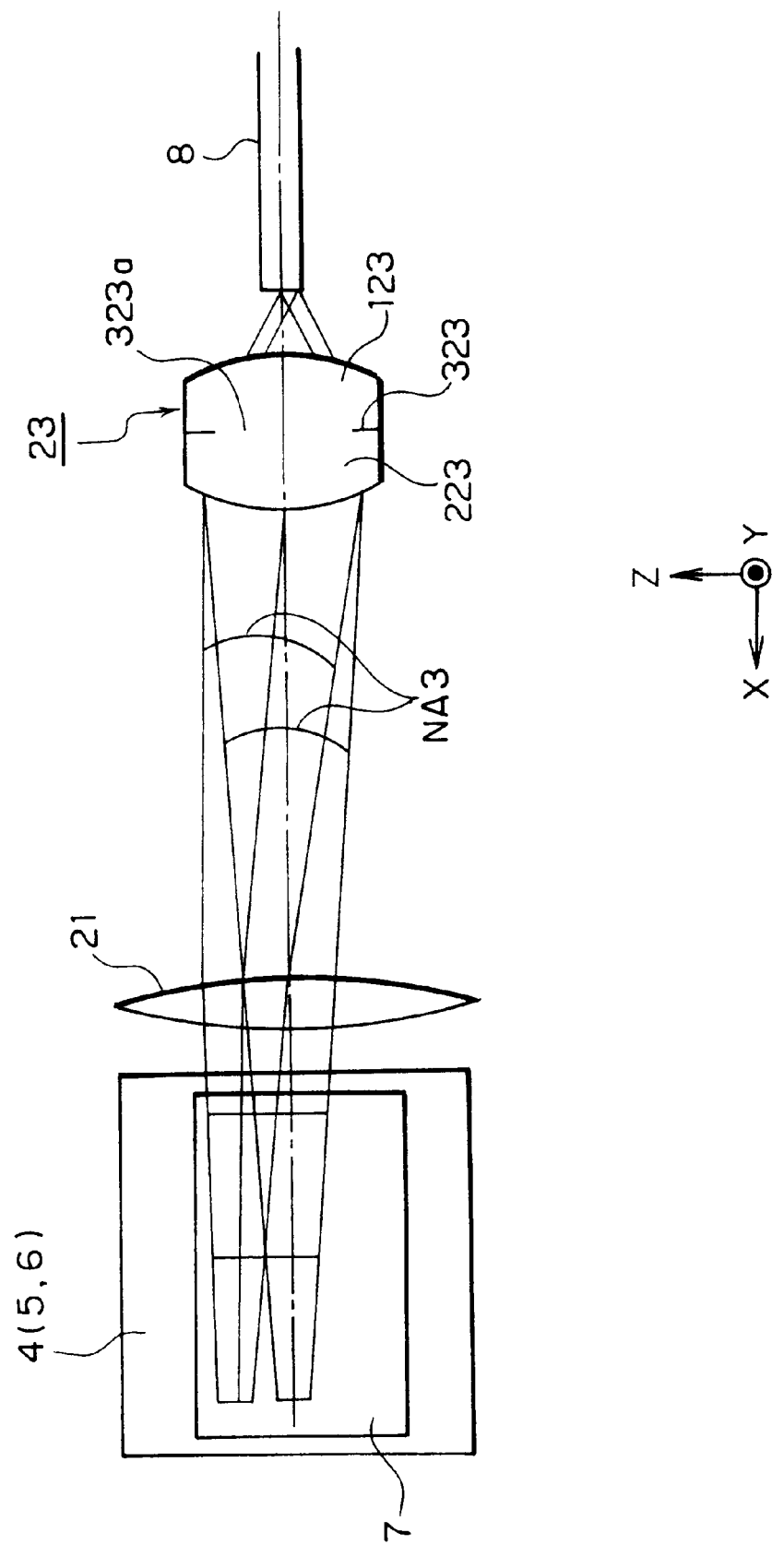
FIG. 10 is a diagram showing states of light beams in the projection type display apparatus of FIG. 8, which is the diagram of the light beams viewed in ⁻Y direction in FIG. 8.
Figure 11:
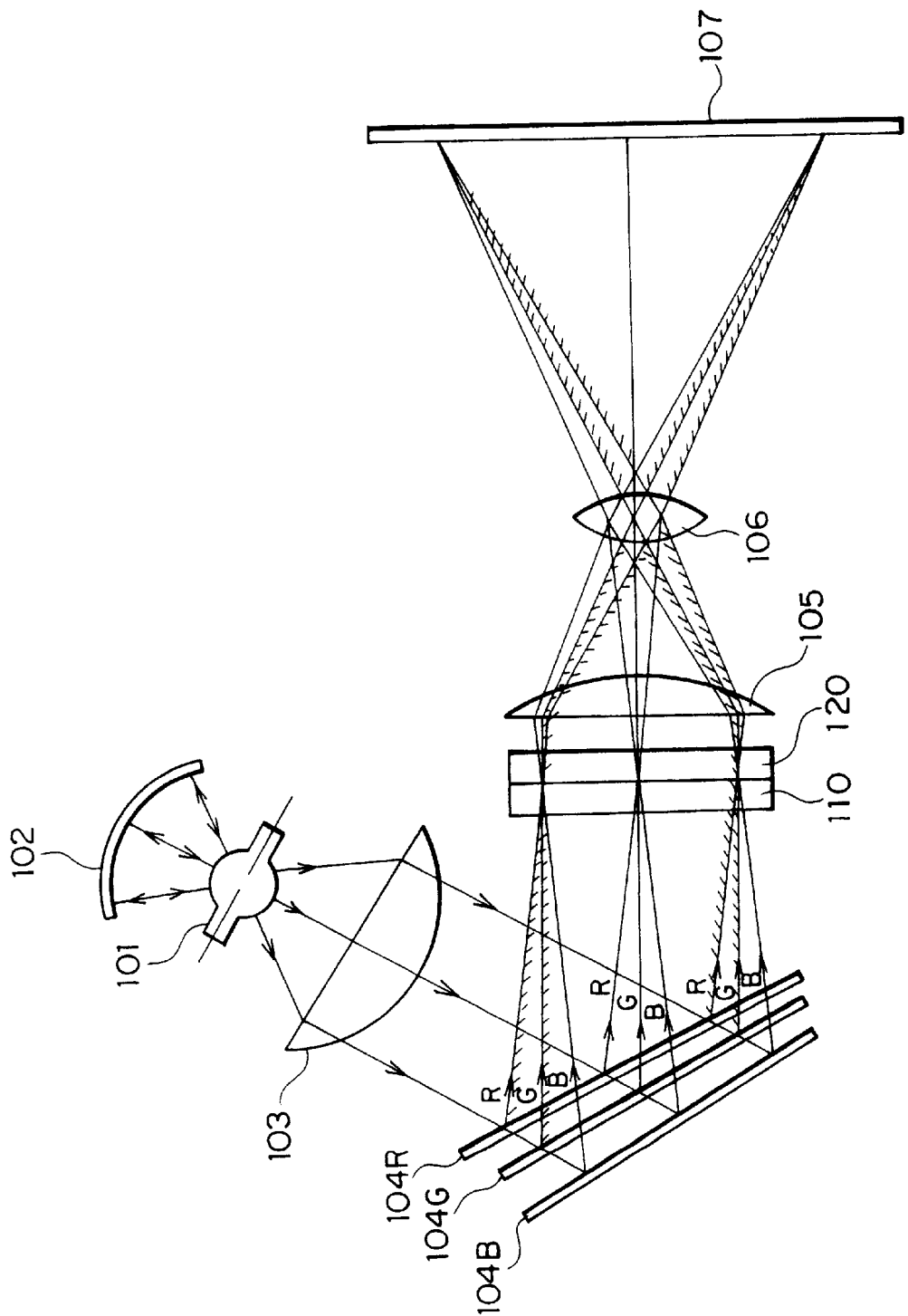
FIG. 11 is a schematic constitutional view showing a conventional projection type display apparatus.
Figure 12:
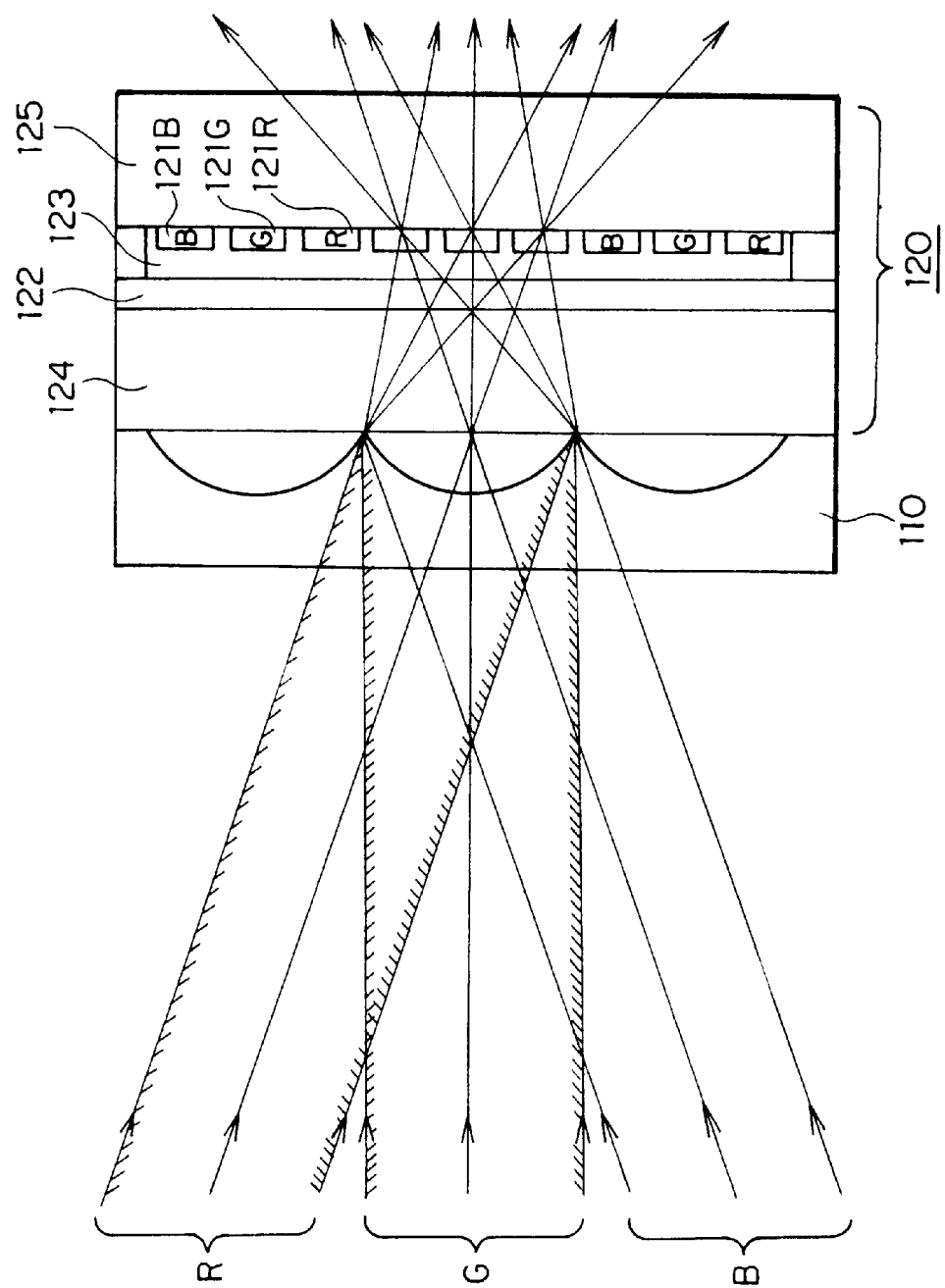
FIG. 12 is a schematic section view showing a light valve of the conventional projection type display apparatus shown in FIG. 11.

FIG. 10 is a diagram of the projection type display apparatus of this embodiment, which is the diagram showing the foregoing light beam L2 viewed in the ⁻Y direction. As shown in FIG. 10, the light beam L2 emitted from the luminous point on the optical axis which is at the central portion on the emission surface of the rod integrator 8 is incident onto the relay lens 23, and exits from the relay lens 23 with the numerical aperture NA3 (larger than the foregoing numerical aperture NA1) which is determined by the longer side length of the opening 323a of the aperture stop 323 of the relay lens 23. The light beam L2 is collected on the optical axis of the light valve 7.

The light beam L2 emitted from the luminous point disposed at the lower portion of the emission surface of the rod integrator 8 shown in FIG. 10 is incident onto the relay lens 23, and advances from the relay lens 23, while deviating in the Z direction from the optical axis with the numerical aperture NA3. The principal ray thereof is made in parallel with the optical axis by the field lens 21, and is incident onto the color separation optical system 4, 5 and 6. Each color light beam which has been subjected to the color separation by the respective color separation optical system 4, 5 and 6 is collected on the light valve 7 while offering the numerical aperture NA3.

The light beam L2 of each color having the numerical aperture NA3, which is incident onto the light valve 7, is emitted from the light valve 7, while offering the numerical aperture NA4 (not shown) as each color, similar to the description as to FIG. 6 of the first embodiment, and is incident onto the projection lens 22.

It should be noted that the numerical aperture NA6 is approximately in agreement with the numerical aperture NA4 because the numerical aperture NA5 is approximately in agreement with the numerical aperture NA3.

Since the projection lens 22 is manufactured so that it can project the incident light beam having the numerical aperture up to a maximum of NA4 similar to the first embodiment, the whole light beams L1 and L2 offering the same numerical aperture (NA5=NA3) can be incident onto the projection lens 22, so that the projection image can be effectively projected also in this embodiment, resulting in the acquisition of a high luminance of projection image.

Moreover, also in this embodiment, similar to the first embodiment, although the shape of the pixel formed in the light valve 7 is a rectangle, the numerical aperture of the light beam L2 can be made larger compared to the conventional projection type display apparatus, so that it is possible to effectively illuminate the pixel in its longitudinal direction. Thus, the light beam can be emitted from the light valve 7 with the large numerical aperture NA4, and a high luminance of projection image can be similarly projected.

As is apparent from the above descriptions, also in this embodiment, similar to the first embodiment, the numerical aperture NA3 is set to be larger than the numerical aperture NA1 and the numerical apertures NA5 and NA3 are set to be approximately equal. The foregoing numerical aperture NA3 is the one of the light beams collected at each position on the light valve 7, which are formed of respective light beams of the R, G and B light, and is the one on the plane perpendicular to the plane (XY plane) optically corresponding to the foregoing reference plane (XY plane), which includes the optical axis. The foregoing numerical aperture NA1 is the one of the light beams collected at each position on the light valve 7, which are formed of respective light beams of the R, G and B light, and is the one on the plane in parallel to the plane (XY plane) optically corresponding to the foregoing reference plane (XY plane), which includes the optical axis. The foregoing numerical aperture NA5 is the one of the whole of the light beams (the foregoing mixed light beam), which are composed of the light beam of the R light which is incident onto the predetermined position of the light valve 7, the light beam of the G light which is incident onto the same position as the predetermined position on the light valve 7, and the light beam of the B light which is incident onto the same position as the predetermined position on the light valve 7. The numerical aperture NA5 is also the numerical aperture in the plane in parallel with the plane (XY plane) optically corresponding to the foregoing reference plane (XY plane), which includes the optical axis.

Although embodiments of the present invention were described as above, the present invention is not limited to these.

In the foregoing embodiments, though the shape of the pixel for each color light formed in the light valve 7 used is the rectangle as shown in FIG. 7, the shape is not limited to this shape. For example, when a light valve in which square-shaped pixels are arranged is used, it is similarly possible to illuminate with the light beam L2 offering a large numerical aperture. Therefore, a projection image of a high luminance can be projected, compared to the conventional projection type display apparatus.

Although the preferred embodiments of the present invention have been described in detail, it should be understood that various changes, substitutions and alterations can be made therein without departing from spirit and scope of the inventions as defined by the appended claims.

What is claimed is:

1. A projection type display apparatus comprising:
    a light source for generating illumination light;
    a color separation optical system on which said illumination light is incident, said color separation optical system having a plurality of mirror planes which are perpendicular to a predetermined plane, that includes an optical axis of said incident illumination light, and which form predetermined angles with each other, the plurality of mirror planes separating the incident illumination light into a plurality of light beams of different colors that are emitted from said color separation optical system in different predetermined directions, respectively;
    a light valve on which said different color light beams are collectively incident from directions corresponding to said predetermined directions and which modulates said different color light beams;
    a numerical aperture defining device which defines, with respect to each of said different color light beams to be collectively incident on said light valve, a first numerical aperture that is smaller than a second numerical aperture, where the first numerical aperture is defined on a plane parallel to said predetermined plane, and the second numerical aperture is defined on a plane perpendicular to said predetermined plane; and a projection optical system which projects the light beams modulated by said light valve.

2. The projection type display apparatus according to claim 1, wherein said numerical aperture defining device comprises a first lens plate having a plurality of lenses, which divides the light from said light source into a plurality of light beams, and a second lens plate having a plurality of lenses, which superposes the plurality of light beams divided by said first lens onto said light valve, thereby illuminating said light valve with the superposed light beams.

3. The projection type display apparatus according to claim 2, wherein a length of said second lens plate in a direction parallel to said predetermined plane and perpendicular to said optical axis is shorter than that in a direction perpendicular to said predetermined plane.

4. The projection type display apparatus according to claim 3, wherein a length of said first lens plate a direction in parallel to said predetermined plane and perpendicular to said optical axis is equal to that in a direction perpendicular to said predetermined plane.

5. The projection type display apparatus according to claim 1, wherein said numerical aperture defining device comprises a rod integrator changing light from said light source into a plane light source; a relay lens which projects an image of said plane light source onto said light valve; and an aperture stop disposed at a pupil position of said relay lens.

6. The projection type display device according to claim 5, wherein an opening of said aperture stop takes a shape in which a length in a direction parallel to said predetermined plane and perpendicular to said optical axis is shorter than that in a direction perpendicular to said predetermined plane.

7. The projection type display apparatus according to claim 2, wherein said plurality of mirror planes are first, second and third mirror planes which separate light from said light source into first, second and third color light beams and emit the first, second and third color light beams into first, second and third directions different from each other; said first mirror plane has a dichroic property to reflect said first color light beam into said first direction and to allow said second and third color light beams to pass therethrough; said second mirror plane has a dichroic property to reflect said second color light beam into said second direction and to allow said third color light beam to pass therethrough; and said third mirror plane has a dichroic property or a total reflection property to reflect said third color light beam into said third direction, and said light valve modulates said first, second and third color light beams respectively when said first, second and third light beams emitted from said first, second and third mirror planes are incident thereon from different directions corresponding to said first, second and third directions.

8. The projection type display apparatus according to claim 5, wherein said plurality of mirror planes are first, second and third mirror planes which separate the light from said light source into first, second and third color light beams and emit the first, second and third color light beams into first, second and third directions different from each other; said first mirror plane has a dichroic property to reflect said first color light beam into said first direction and to allow said second and third color light beams to pass therethrough; said second mirror plane has a dichroic property to reflect said second color light beam into said second direction and to allow said third color light beam to pass therethrough; and said third mirror plane has a dichroic property or a total reflection property to reflect said third color light beam into said third direction, and said light valve modulates said first, second and third color light beams respectively when said first, second and third light beams emitted from said first, second and third mirror planes are incident thereon from different directions corresponding to said first, second and third directions.

9. The projection type display apparatus according to claim 8, wherein said aperture stop has a shape in which a length in a fourth direction perpendicular to a plane optically corresponding to a reference plane including said optical axis immediately before an incidence onto said color separation optical system is longer than that in a fifth direction perpendicular to said optical axis and said fourth direction, said reference plane being formed by normal lines to said first, second and third mirror planes and said optical axis immediately before the incidence onto said color separation optical system.

10. A projection type display apparatus comprising:

a light source for generating illumination light;

a color separation optical system on which said illumination light is incident, said color separation optical system having a plurality of mirror planes which are perpendicular to a predetermined plane, that includes an optical axis of said incident illumination light, and which form predetermined angles with each other, the plurality of mirror planes separating the incident illumination light into a plurality of light beams of different colors that are emitted from said color separation optical system in different predetermined directions, respectively;

a light valve on which said different color light beams are collectively incident from directions corresponding to said predetermined directions and which modulates said different color light beams;

a numerical aperture defining device which defines one numerical aperture to be equal to another numerical aperture, where said one numerical aperture is, with respect to each of said light beams of different colors to be collectively incident on said light valve, in a plane perpendicular to said predetermined plane and including an optical axis of the light passed through the color separation optical system, said another numerical aperture is, with respect to all the light beams of different colors to be collectively incident on said light valve, in a plane parallel to said predetermined plane and including the optical axis of the light passed through the color separation optical system; and a projection optical system which projects the light beams modulated by said light valve.

11. The projection type display apparatus according to claim 10, wherein said numerical aperture defining device comprises a first lens plate having a plurality of lenses, which divides the light from said light source into a plurality of light beams, and a second lens plate having a plurality of lenses, which superposes the plurality of light beams divided by said first lens onto said light valve, thereby illuminating said light valve with the superposed light beams.

12. The projection type display apparatus according to claim 10, wherein said numerical aperture defining device comprises a rod integrator changing light from said light source into a plane light source; a relay lens which projects an image of said plane light source onto said light valve; and an aperture stop disposed at a pupil position of said relay lens.

13. A projection type display apparatus comprising:

a light source for generating illumination light;

a color separation optical system on which said illumination light is incident, said color separation optical system having a plurality of mirror planes which are perpendicular to a predetermined plane, that includes an optical axis of said incident illumination light, and which form predetermined angles with each other, the plurality of mirror planes separating the incident illumination light into a plurality of light beams of different colors that are emitted from said color separation optical system in different predetermined directions, respectively;

a light valve on which said different color light beams are collectively incident from directions corresponding to said predetermined directions and which modulates said different color light beams;

a numerical aperture defining device including a first lens plate having a plurality of lenses, which divides the light from said light source into a plurality of light beams, and a second lens plate having a plurality of lenses, which superposes the plurality of light beams divided by said first lens plate onto said light valve, thereby illuminating said light valve with the superposed light beams, a refractive power of said first lens plate being larger than that of said second lens plate in a direction parallel to said predetermined plane and perpendicular to said optical axis; and a projection optical system which projects the light beams modulated by said light valve.

14. The projection type display apparatus according to claim 13, wherein a difference between the refractive power of said first lens plate and the refractive power of said second lens plate in a direction parallel to said predetermined plane and perpendicular to said optical axis is larger than that between a refractive power of said first lens plate and a refractive power of said second lens plate in a direction perpendicular to said predetermined plane.

15. A projection type display apparatus comprising:

a light source for generating illumination light;

a color separation optical system on which said illumination light is incident, said color separation optical system having a plurality of mirror planes which are perpendicular to a predetermined plane, that includes an optical axis of said incident illumination light, and which form predetermined angles with each other, the plurality of mirror planes separating the incident illumination light into a plurality of light beams of different colors that are emitted from said color separation optical system in different predetermined directions, respectively;

a light valve on which said different color light beams are collectively incident from directions corresponding to said predetermined directions and which modulates said different color light beams;

a numerical aperture defining device including a first lens plate having a plurality of lenses, which divides light from said light source into a plurality of light beams, and a second lens plate having a plurality of lenses, which superposes the plurality of light beams divided by said first lens plate onto said light valve, thereby illuminating said light valve with the superposed light beams, a refractive power of said first lens plate being smaller than that of said second lens plate in a direction perpendicular to said predetermined plane; and a projection optical system which projects the light beams modulated by said light valve.

16. The projection type display apparatus according to claim 15, wherein a difference between the refractive power of said first lens plate and the refractive power of said second lens plate in a direction parallel to said predetermined plane and perpendicular to said optical axis is larger than that between the refractive power of said first lens plate and the refractive power of said second lens plate in a direction perpendicular to said predetermined plane.

17. A projection type display apparatus comprising:

a light source for generating illumination light;

a color separation optical system on which said illumination light is incident, said color separation optical system having a color separation surface which is disposed perpendicular to a predetermined plane, that includes an optical axis of said incident illumination light, and which separates the incident illumination light into a plurality of color beams;

a light valve on which said color beams are incident and which modulates each of said color beams;

a projection optical system which projects the light beams modulated by said light valve; and a numerical aperture defining means, for defining with respect to each of said light beams to be incident on said light valve, a first numerical aperture that is smaller than a second numerical aperture, where the first numerical aperture is on a plane parallel to said predetermined plane, and the second numerical aperture is on a plane perpendicular to said predetermined plane.

* * * * *